(12) United States Patent
Cataltepe

(10) Patent No.: US 11,315,030 B2
(45) Date of Patent: Apr. 26, 2022

(54) CONTINUOUSLY LEARNING, STABLE AND ROBUST ONLINE MACHINE LEARNING SYSTEM

(71) Applicant: Tazi AI Systems, Inc., Sausalito, CA (US)

(72) Inventor: Tanju Cataltepe, Istanbul (TR)

(73) Assignee: TAZI AI SYSTEMS, INC., Sausalito, CA (US)

(*) Notice: Subject to any disclaimer, the term of this patent is extended or adjusted under 35 U.S.C. 154(b) by 813 days.

(21) Appl. No.: 16/125,742

(22) Filed: Sep. 9, 2018

(65) Prior Publication Data

US 2019/0279102 A1 Sep. 12, 2019

Related U.S. Application Data

(60) Provisional application No. 62/639,490, filed on Mar. 6, 2018.

(51) Int. Cl.
*G06N 3/04* (2006.01)
*G06N 5/04* (2006.01)
(Continued)

(52) U.S. Cl.
CPC .......... *G06N 5/043* (2013.01); *G06K 9/6218* (2013.01); *G06K 9/6231* (2013.01);
(Continued)

(58) Field of Classification Search
CPC ........... G06N 3/0454; G06N 5/02; G06N 5/04
See application file for complete search history.

(56) References Cited

U.S. PATENT DOCUMENTS 6,941,288 B2 9/2005 Lee et al.
7,707,131 B2 4/2010 Chickering et al.
(Continued)

FOREIGN PATENT DOCUMENTS

WO 2010/081238 A1 7/2010
WO 2015/179632 A1 11/2015
(Continued)

OTHER PUBLICATIONS

Yu, Lei, and Huan Liu. "Efficient feature selection via analysis of relevance and redundancy." The Journal of Machine Learning Research 5 (2004): 1205-1224. (Year: 2004).*
(Continued)

*Primary Examiner* — Hal Schnee
(74) *Attorney, Agent, or Firm* — Mauriel Kapouytian Woods LLP; Tzvi Hirshaut; Andrew A. Noble

(57) ABSTRACT

An Online Machine Learning System (OMLS) including an Online Preprocessing Engine (OPrE) configured to (a) receive streaming data including an instance comprising a vector of inputs, the vector of inputs comprising a plurality of continuous or categorical features; (b) discretize features; (c) impute missing feature values; (d) normalize features; and (e) detect drift or change in features; an Online Feature Engineering Engine (OFEE) configured to produce features; and an Online Robust Feature Selection Engine (ORFSE) configured to evaluate and select features; an Online Machine Learning Engine (OMLE) configured to incorporate and utilize one or more machine learning algorithms or models utilizing features to generate a result, and capable of incorporating and utilizing multiple different machine learning algorithms or models, wherein each of the OMLE, the OPrE, the OFEE, and the ORFSE are continuously communicatively coupled to each other, and wherein the OMLS is configured to perform continuous online machine learning.

32 Claims, 29 Drawing Sheets

(51) Int. Cl.
G06K 9/62 (2022.01)
G06N 7/00 (2006.01)
G06N 20/00 (2019.01)

(52) U.S. Cl.
CPC ......... *G06K 9/6253* (2013.01); *G06K 9/6263* (2013.01); *G06N 3/04* (2013.01); *G06N 3/0454* (2013.01); *G06N 7/00* (2013.01); *G06N 20/00* (2019.01)

(56) References Cited

U.S. PATENT DOCUMENTS

| | | | |
|---|---|---|---|
| 8,904,149 | B2 | 12/2014 | Eren et al. |
| 9,256,838 | B2 | 2/2016 | Sow et al. |
| 9,324,022 | B2 | 4/2016 | Williams, Jr. et al. |
| 10,364,662 | B1 * | 7/2019 | Basu ................ G06N 20/00 |
| 10,841,257 | B1 * | 11/2020 | Bragdon ............. H04L 51/046 |
| 2003/0191732 | A1 | 10/2003 | Lee et al. |
| 2009/0196464 | A1 | 8/2009 | Dimitrova et al. |
| 2012/0143799 | A1 | 6/2012 | Wilson et al. |
| 2013/0226842 | A1 | 8/2013 | Chu et al. |
| 2015/0254555 | A1 | 9/2015 | Williams, Jr. et al. |
| 2016/0063397 | A1 | 3/2016 | Ylipaavalniemi et al. |
| 2016/0358099 | A1 | 12/2016 | Sturlaugson et al. |
| 2017/0076211 | A1 * | 3/2017 | Kusumura ............. G06N 5/04 |
| 2017/0330109 | A1 | 11/2017 | Maughan et al. |
| 2018/0189655 | A1 | 7/2018 | Oh et al. |
| 2018/0204134 | A1 | 7/2018 | Stewart |
| 2018/0219887 | A1 * | 8/2018 | Luo ................ H04L 63/14 |
| 2018/0225391 | A1 * | 8/2018 | Sali ................ G06F 7/588 |
| 2019/0188531 | A1 * | 6/2019 | Ozcaglar ............. G06K 9/6212 |
| 2019/0303801 | A1 * | 10/2019 | Horton ................ G06F 40/30 |
| 2019/0325352 | A1 * | 10/2019 | Tsai ................ G06F 16/282 |
| 2020/0019881 | A1 * | 1/2020 | Luo ................ G06F 17/18 |
| 2020/0257979 | A1 * | 8/2020 | Luo ................ G06N 3/084 |

FOREIGN PATENT DOCUMENTS

| | | |
|---|---|---|
| WO | 2018/053464 A1 | 3/2018 |
| WO | 2018/102919 A1 | 6/2018 |
| WO | 2018/142266 A1 | 8/2018 |

OTHER PUBLICATIONS

Cassidy, Andrew Phelps, and Frank A. Deviney. "Calculating feature importance in data streams with concept drift using Online Random Forest." 2014 IEEE International Conference on Big Data (Big Data). IEEE, 2014. (Year: 2014).*

Liu, Dong, YouXi Wu, and He Jiang. "FP-ELM: An online sequential learning algorithm for dealing with concept drift." Neurocomputing 207 (2016): 322-334. (Year: 2016).*
The International Search Report and Written Opinion issued in International Application No. PCT/US2018/050133 dated Jan. 7, 2019. 12 pages.
Aggarwal, "A Survey of Stream Classification Algorithms," Springer Science & Business Media, vol. 31, 2007, 29 pages.
Alpaydin, "Introduction to Machine Learning Figures," MIT press, 2004, 153 pages.
Bifet et al., "Data Stream Mining A Practical Approach," Aug. 2009, 167 pages.
Bifet et al., "MOA: Massive Online Analysis," Journal of Machine Learning Research 11, 2010, pp. 1601-1604.
Blum et al., "Combining Labeled and Unlabeled Data with Co-Training," Proceedings of the eleventh annual conference on Computational learning theory, ACM, 1998, pp. 92-100.
Domingos et al., "Mining High-Speed Data Streams," Proceedings of the sixth ACM SIGKDD international conference on Knowledge discovery and data mining, ACM, 2000, pp. 71-80.
Jaworski et al., "New Splitting Criteria for Decision Trees in Stationary Data Streams," IEEE transactions on neural networks and learning systems, vol. 29, No. 6, Jun. 2018, pp. 2516-2529.
Kaya et al., "Multi-modal Score Fusion and Decision Trees for Explainable Automatic Job Candidate Screening from Video CVs," CVPR Workshops, 2017, 9 pages.
Lundberg et al., "A Unified Approach to Interpreting Model Predictions," Advances in Neural Information Processing Systems, 2017, 10 pages.
Pondel et al., "A view on the methodology of analysis and exploration of marketing data," Computer Science and Information Systems (FedCSIS), 2017, pp. 1135-1143.
Qiu et al., "A survey of machine learning for big data processing," EURASIP Journal on Advances in Signal Processing, 2016, 16 pages.
Schnizler et al., "Heterogeneous Stream Processing for Disaster Detection and Alarming," 2014 IEEE International Conference on Big Data (Big Data), 10 pages.
Vorhies, "Next Generation Automated Machine Learning (AML)," https://www.datasciencecentral.com/profiles/blogs/next-generation-automated-machine-learning-aml, 5 pages.
Wang et al., "Auto-encoder based dimensionality reduction," Neurocomputing 184, 2016, pp. 232-242.
Cataltepe et al., "Online Feature Selected Semi-Supervised Decision Trees for Network Intrusion Detection," Network Operations and Management Symposium (NOMS), 2016, pp. 1085-1088.
U.S. Appl. No. 16/125,743 dated Sep. 9, 2018, Tanju Cataltepe.
U.S. Appl. No. 16/125,744 dated Sep. 9, 2018, Tanju Cataltepe.
Guyon et al., An Introduction to Variable and Feature Selection, Journal of Machine Learning Research 3, Published Mar. 2003, pp. 1157-1182.

* cited by examiner

| to_payi | is_transition | company_tra | merged_com | latest_highest | gender | outgoing_tra | payment_am | num_days_pa |
|---|---|---|---|---|---|---|---|---|
| 0 | 0 | 0 | E | SCHM--45 | E | 0 | 2080 | 0 |
| 0 | 0 | 0 | F | IWM-1 | E | 0 | 3770 | 0 |
| 0 | 0 | 0 | E | SCHM--45 | E | 0 | 3550 | 0 |
| 0 | 0 | 0 | E | SCHM--45 | K | 0 | 3080 | 0 |
| 0 | 0 | 0 | F | IJR--4 | K | 0 | 5650 | 0 |
| 0 | 0 | 0 | F | SPSM--84 | E | 0 | 1200 | 0 |
| 0 | 0 | 0 | F | VBK--5 | K | 0 | 3300 | 0 |
| 0 | 0 | 0 | F | VBK-1 | K | 0 | 4200 | 0 |
| 0 | 0 | 0 | F | SPSM-1 | E | 0 | 2600 | 0 |
| 0 | 0 | 0 | F | IJR--58 | K | 0 | 9820 | 0 |

Export All Instances (562)

FIG. 11 paid at least one of the last 3 terms
city churn ratio < 0.53
increase of payment in the last month
city churn ratio < 0.46
is not transitioned from another company
is recruited by the company internal resources

CONTINUOUSLY LEARNING, STABLE AND ROBUST ONLINE MACHINE LEARNING SYSTEM

CROSS REFERENCE TO RELATED APPLICATIONS

This application claims the benefit of priority to U.S. Provisional Application No. 62/639,490, filed Mar. 6, 2018 before the United States Patent and Trademark Office. This and all other extrinsic materials referenced herein are incorporated by reference in their entirety.

INTRODUCTION

The present technology relates generally to machine learning systems. More particularly, embodiments of the present invention relate to: (1) A Continuously Learning, Stable and Robust Online Machine Learning System (OMLS); (2) An Online Machine Learning System (OMLS) that is Human Understandable; and (3) An Online Machine Learning System (OMLS) that can Learn in a User-Friendly Way from both Human and Data at the Same Time.

1. A Continuously Learning, Stable and Robust Online Machine Learning System (OMLS)

Machine learning models that can learn from data have been used in practice in many different industries such as finance, telecommunications, insurance and health. In most of the current practice, the machine learning models are trained on the available data set in batch mode. In this mode, the available dataset is divided into non-overlapping training and validation (and sometimes additional test) sets. For different hyperparameter settings, the machine learning model is trained. The hyperparameters could be, for example, for a neural network: the number of layers, the numbers of hidden units, choice of activation functions, optimization methods; for a decision tree: the maximum number of layers, the minimum number of instances for a node to become a parent, the minimum impurity before which a node can become a parent; for a clustering algorithm: the number of clusters, distance functions used. The machine learning algorithms' parameters are updated to optimize a performance criterion as accuracy, AUC (Area Under the ROC Curve), precision, recall, f-measure on a training dataset [Alpaydin, E. (2014). Introduction to machine learning. MIT press]. The performance of the trained model is evaluated on the validation set and the model hyperparameters are decided based on the validation set performance. One of the underlying reasons for this training-validation practice is the fact that most machine learning models that are complex enough can fit (and hence overfit) any training set if they are given hyperparameters of enough complexity, and it is desired to have stable (not overfitted) models while the world that created the data keeps changing. Although many businesses have terabytes of data in their systems, the emerging patterns in the data start with small number of observations, therefore stable, not overfitting models are desired in order to be able to take reliable actions on them. Another desirable property of any machine learning system is that it is robust to changes in the world which triggers changes in the data that can manifest themselves, for example, as additions/deletions/modifications of the features or patterns. To sum up, businesses need stable and robust machine learning systems with high performance.

In the batch learning scenario, the validated model is deployed and it is used to make predictions. Models are usually periodically trained and validated to make sure that their performance does not degrade over time, however, especially when data keep continuously changing, the models may perform poorly in between these periodical trainings and also it is difficult to know when to train the models again especially in situations (such as churn, fraud, etc.) where the labels for the current instances are not available immediately. Furthermore, the model trained in the previous iteration may be very different from the new one, and understanding and operating with the new model can be difficult for the business people.

In order to overcome the shortcomings of batch learning models, online learning models that learn continuously from data have been used [Pedro Domingos and Geoff Hulten. Mining High-Speed Data Streams. In Proceedings of the sixth ACM SIGKDD international conference on Knowledge discovery and data mining, KDD '00, pages 71-80, New York, N.Y., USA, 2000. ACM; Bifet, A., Holmes, G., Kirkby, R., & Pfahringer, B. (2010). Moa: Massive online analysis. The Journal of Machine Learning Research, 11, 1601-1604; Aggarwal, C. C. (2014). A Survey of Stream Classification Algorithms. Data Classification: Algorithms and Applications, 245; Cataltepe, Z., Ekmekci, U., Cataltepe, T., & Kelebek, I. (2016, April). Online feature selected semi-supervised decision trees for network intrusion detection. In Network Operations and Management Symposium (NOMS), 2016 IEEE/IFIP (pp. 1085-1088). IEEE; Jaworski, M., Duda, P., & Rutkowski, L. (2018)]. New splitting criteria for decision trees in stationary data streams. IEEE transactions on neural networks and learning systems, 29(6), 2516-2529]. While these models usually are able to adapt to changing datasets, they have not yet been adapted in domains such as banking, insurance or health, due to performance, robustness, stability and also understandability issues. In these domains, and in general, the decision makers need to be accountable for their actions. However, since the models keep continuously changing, it is difficult to keep the performances of the models and also track of how models decided at different times and hence be accountable for their decisions. It is also difficult to understand if the decisions made at different times are comparable to each other. Since data behavior and also data sources keep changing, businesses also need machine learning systems that can include new features or can function when some old features disappear. Based on the machine learning outputs, some actions, such as CRM, sales, marketing, pricing decisions are planned, an online machine learning system also needs to be as stable as possible, so that the business continuity can be maintained.

2. An Online Machine Learning System (OMLS) that is Human Understandable

One of the problems of complex machine learning models in general and deep learning models in particular is that they produce black box models that are not easily understandable by the domain experts. Even though there are attempts to explain these models [Lundberg, S. M., & Lee, S. I. (2017). A unified approach to interpreting model predictions. In Advances in Neural Information Processing Systems (pp. 4765-4774)], the explanations are oriented towards data scientists and may still not be understandable and hence trustable by the business people. They are even more difficult to understand by the people who are affected by the machine learning models' outcomes, for example a credit card applicant whose application has been rejected, or an insurance customer whose claim was marked as fraudulent. Even if the machine learning model is not a deep neural network but a combination of a set of various machine learning algorithms, the outputs of the algorithms may not be easy to understand by humans. Attempts to make machine learning models understandable, such as [Lundberg, S. M., & Lee, S. I. (2017). A unified approach to interpreting model predictions. In Advances in Neural Information Processing Systems (pp. 4765-4774)], require different models to be trained for each instance and hence are not feasible for learning on streaming data. For continuously learning machine learning models that keep changing in time, understandable models become even more of a problem since the decision makers need to understand not a single model, but basically a set of models whose internal parameters and hence their explanations keep changing all the time.

3. An Online Machine Learning System (OMLS) that can Learn in a User-Friendly Way from both Human and Data at the Same Time In almost every domain, the patterns in the collected data keep changing rapidly due to external factors (such as political, economical, social, environmental or regulatory changes) or business decisions such as different campaigns or products offered to the customers by the company or its competitors. When batch machine learning systems are used, the only way the machine learning system can adapt to these changes is through complete retraining of the model when enough data has been accumulated, which not only takes time but also may cause loss of business opportunity and also discontinuity in the business processes. When continuous machine learning systems are used, the model adapts to the change without an interruption, however, it will still take time to learn the change. In many cases, when there is or is expected to be a change known to the domain expert, there is a lost opportunity if the expert's knowledge cannot be integrated into the machine learning system.

It is important that the domain expert can update the machine learning models to help the algorithms perform better in the presence of change. In order to be able to update the machine learning models, not only a user friendly mechanism built within the business processes, but also understandable machine learning models are required.

In addition to model updates due to change, the domain expert time may be required to get input for certain instances, such as fraud or anomaly. However, getting the label for an instance is expensive because the domain expert time is usually expensive or not available. The human expert can provide feedback on the selected alerts or instances where the online machine learning system is not certain and accelerate the learning through these feedbacks. Active machine learning [Settles, B. (2012). Active learning. Synthesis Lectures on Artificial Intelligence and Machine Learning, 6(1), 1-114] and co-training [Blum, A., & Mitchell, T. (1998, July). Combining labeled and unlabeled data with co-training. In Proceedings of the eleventh annual conference on Computational learning theory (pp. 92-100). ACM] are some of the techniques that have been used to get feedback from the humans for batch machine learning systems.

BRIEF DESCRIPTION OF THE DRAWINGS

FIGS. 7-14 illustrate screenshots of an electronic device implementing one or more aspects of an embodiment of the invention;

While the invention is described with reference to the above drawings, the drawings are intended to be illustrative, and the invention contemplates other embodiments within the spirit of the invention.

DETAILED DESCRIPTION OF EMBODIMENTS OF THE PRESENT INVENTION

The present invention will now be described more fully hereinafter with reference to the accompanying drawings which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as devices or methods. Accordingly, the present invention may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one embodiment," "in an embodiment," and the like, as used herein, does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
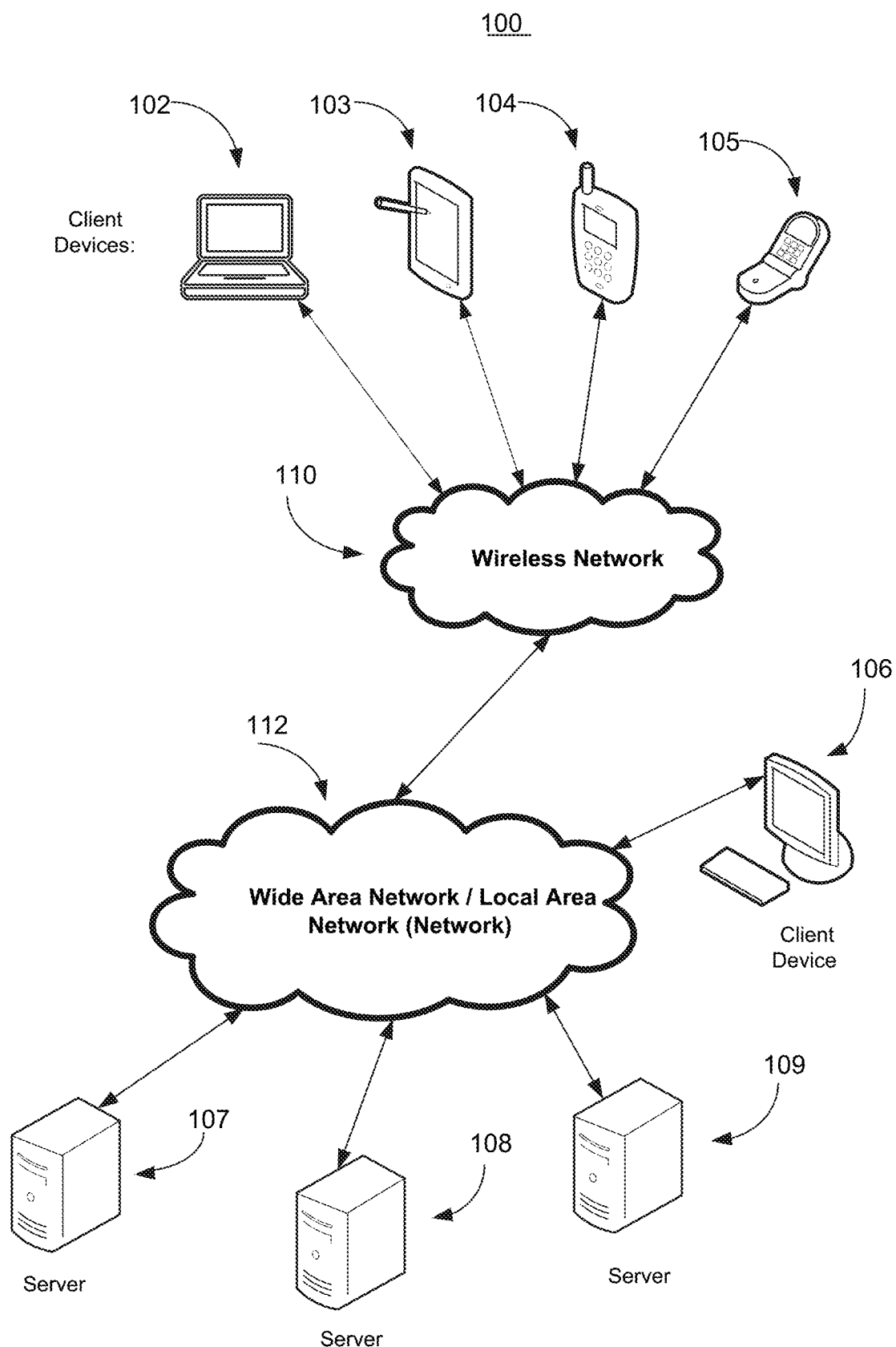
FIG. 1 illustrates a block diagram of a distributed computer system that can implement one or more aspects of an embodiment of the present invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-106, servers 107-109, and may include or communicate with one or more data stores or databases. Various of the client devices 102-106 may include, for example, desktop computers, laptop computers, set top boxes, tablets, cell phones, smart phones, and the like. The servers 107-109 can include, for example, one or more application servers, content servers, search servers, and the like.

Figure 2:
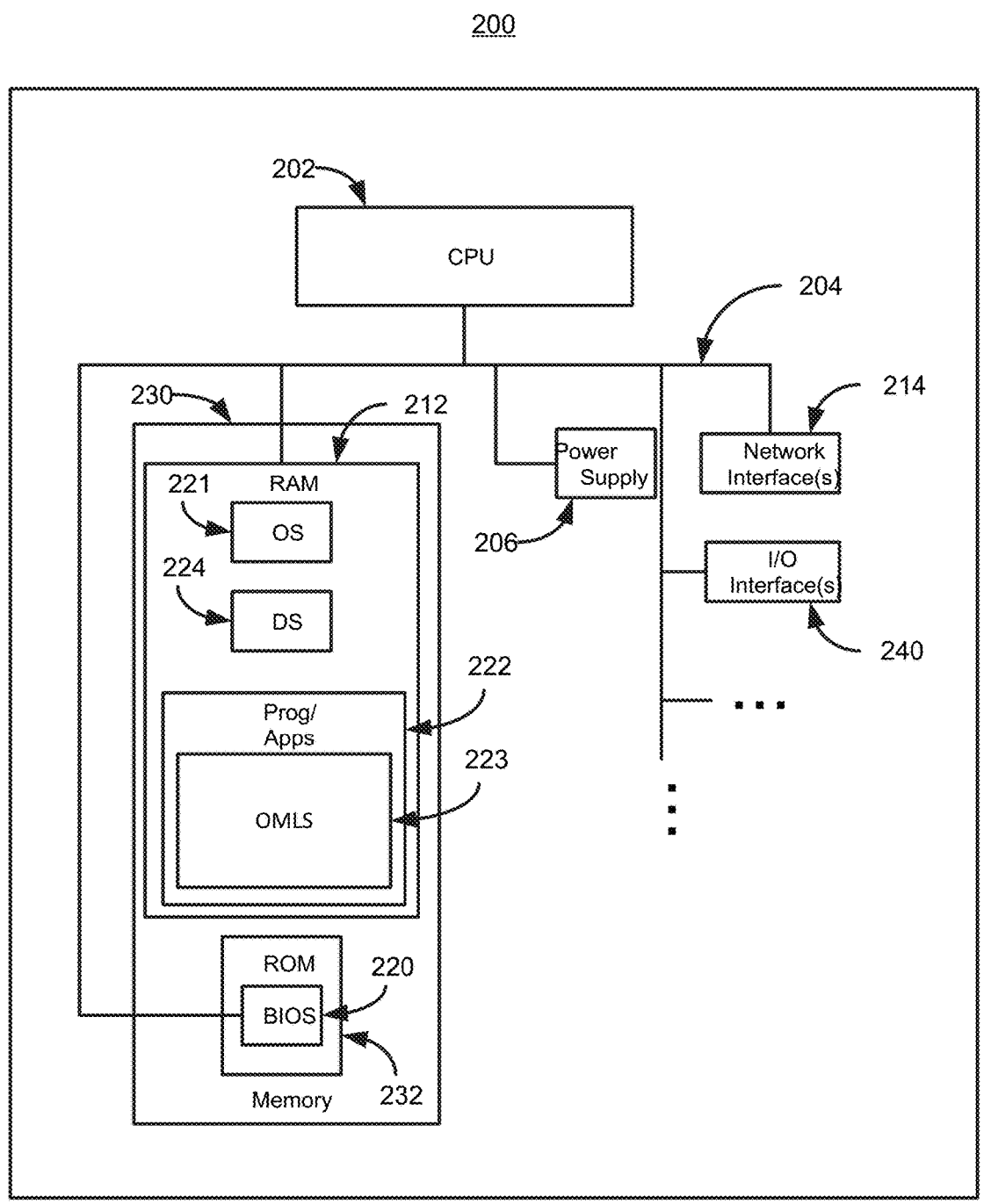
FIG. 2 illustrates a block diagram of an electronic device that can implement one or more aspects of an embodiment of the invention.

FIG. 2 illustrates a block diagram of an electronic device 200 that can implement one or more aspects of systems and methods for interactive video generation and rendering according to one embodiment of the invention. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the Online Machine Learning Program 223. The ROM 232 can also include Basic Input/Output System (BIOS) 220 of the electronic device.

Software aspects of the Online Machine Learning Program 223 are intended to broadly include or represent all programming, applications, algorithms, models, software and other tools necessary to implement or facilitate methods and systems according to embodiments of the invention. The elements may exist on a single server computer or be distributed among multiple computers, servers, devices or entities, such as systems and engines as described in embodiments herein.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the systems and methods for interactive video generation and rendering, via a network to another device. Also, an application server may, for example, host a Web site that can provide a user interface for administration of example aspects of the systems and methods for interactive video generation and rendering.

Any computing device capable of sending, receiving, and processing data over a wired and/or a wireless network may act as a server, such as in facilitating aspects of implementations of the systems and methods for interactive video generation and rendering. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example systems and methods for interactive video generation and rendering. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for interactive video generation and rendering. Content may include, for example, text, images, audio, video, and the like.

In example aspects of the systems and methods for interactive video generation and rendering, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, and the like.

Client devices, as may be used in example systems and methods for interactive video generation and rendering, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Client devices, such as client devices 102-106, for example, as may be used in example systems and methods for interactive video generation and rendering, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the systems and methods for interactive video generation and rendering, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in example systems and methods for interactive video generation and rendering, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in example systems and methods for interactive video generation and rendering, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Some embodiments of the invention provide a continuously operational, high performance, stable, robust OMLS. In some embodiments, the OMLS learns continuously, and learns concurrently from both streaming data and human-provided data. In some embodiments, this includes learning and updating on a per-instance basis from streaming data, as well as on a per-received item basis from human-provided input, concurrently.

In some embodiments, the OMLS includes an Online Machine Learning Engine (OMLE) that may include one ore more machine learning models and/or algorithms. For example, the machine learning models or algorithms could include a combination of one or more decision tree-based algorithms or models, one or more clustering-based algorithms or models, one or more linear regression algorithms or models, one or more neural network algorithms or models, one or more graphical algorithms or models, or others.

In some embodiments, the OMLE may also serve a role in coordinating, managing, and integrating use of the one or more machine learning models or algorithms, as well as in coordination, management, and integration and operation of the OMLS as a whole, including engines and other elements thereof. In some embodiments, the OMLE is able to evaluate, select, keep or delete particular machine learning algorithms or models, for optimization of operation of the OMLS. Furthermore, in some embodiments, the OMLE is able to train each of multiple models according to different criteria, for optimizing overall performance.

In some embodiments, the OMLS includes, in addition to the OMLE, engines including an Online Preprocessing Engine (OPrE), an Online Feature Engineering Engine (OFEE), and an Online Robust Feature Selection Engine (ORFSE). As described further herein, aspects of each of, among other things, the OPrE, OFEE and ORFSE may, among other things, enhance OMLS speed and accuracy performance, stability and robustness. While the various engines are described separately, it is to be understood that, in various embodiments, some or all of them can be overlapping or integrated and not separate or not fully separate.

In some embodiments, the OPrE may receive streaming data including an instance including a vector of inputs including multiple continuous or categorical features, and is able to discretize features, impute missing feature values, normalize features, and detect drift or change in features. The OFEE may produce features. The ORFSE may evaluate and select features.

In some embodiments, the OMLS is able to learn continuously from both streaming data and human input. In some embodiments, the OMLS utilizes techniques to allow or optimize learning from human input. This can include, for example, as described in Section 3.2.2, determining and taking into account OMLS model changes that may occur during the time that an expert is working on, for example, a staged model before actually providing feedback.

In some embodiments, users, such as experts or other decision-makers, are provided with a displayed interactive staging area. The staging area may be used to allow the decision-makers to interactively manipulate, filter, review and update models, for example, to increase model trustworthiness and accountability, or to compare models or model performances. In some embodiments, the OMLS or particular models may include alert modules designed to alert decision-makers to a need for their feedback, and may prompt them with staged models.

In some embodiments, elements or features are provided that facilitate, make easier, or optimize aspects relating to informing or obtaining human feedback, which feedback can include any human input. For example, in some embodiments, tools are provided for facilitating presenting useful OMLS information, in an easily understandable, filterable and/or manipulable way, to a user (such as a domain or business expert), as well as for obtaining, in a simple, fast, and easy way, useful information from the user. For example, in some embodiments, interfaces or other methods are provided to simply, efficiently, effectively, quickly and/or easily obtain feedback from the user. This can include, for example, a graphical interface, a text interface, a haptical interface, a neurological interface, an interface comprising direct detection of electrical brain signals, or others. Furthermore, elements and tools relating to obtaining human feedback may be updated continuously.

Particularly, in some embodiments, the OMLS may communicate with, or may include, an Online Explanation System (OES). The OES may be updated continuously, and may be used in providing instance level explanations and model level explanations to a user. For example, instance level feedback may relate to a particular instance, and model level feedback may be in connection with a set of instances or one or more model decision regions.

The OMLS may further communicate with, or may include, an Online Human Expert Feedback System (OEFS). The OEFS may be updated continuously, and may be used to obtain expert instance level feedback and expert model level feedback, for optimization of operation of the OMLS. Both user or expert instance level feedback and user or expert model level feedback may be used in optimization of operation of the OMLS. The user may be able to review explanations provided by the OES to inform feedback provided via the OEFS.

Both the OES and the OEFS may be user-interactive, and designed to be user-friendly, user-manipulable and efficient.

While the OEFS and the OES are described separately, it is to be understood that they can be overlapping or integrated and not separate at all, and can even be integrated with other aspects of the OMLS.

Some embodiments of the invention provide a continuously learning OMLS that is user friendly and optimally and efficiently obtains and utilizes user, such as expert, feedback. This can include detecting particular situations or areas in which expert feedback would be especially useful, and prompting an expert to provide such feedback, for example. User friendly aspects also include providing relevant and useful system, model and instance information to a user in a user friendly and easily understandable way. It can also include allowing a user to provide feedback in a simple, easy way, such as one or a few actions way, such as, for example, prompted approval or rejection of decision, etc.

In some embodiments, the OMLS is continuously operational, such as, for example, during feature additions and feature deletions.

In some embodiments, the OMLS can be managed or operated to optimize business benefit performance, which can contribute to its business use practicality.

Some embodiments of the invention provide solutions to various technical problems. One technical problem has been providing a continuously learning, stable and robust online machine learning system. Some embodiments of the invention provide technical solutions to that or related technical problems, which can include operation of an OMLE that can include multiple different machine learning algorithms or models. Some embodiments of the invention provide technical solutions to that or related problems, which can that can include operation of the OPrE, OFEE and ORFSE in providing a continuously learning, stable and robust online machine learning system.

Another technical problem has been to provide a continuously learning, stable and robust online machine learning system that learns continuously from both streaming data and human-provided feedback. Some embodiments provide technical solutions to that or related technical problems, such as may include the technology discussed, for example, at section 3.2.2 herein. Furthermore, some embodiments provide technical solutions to that or related technical problems that can include operation of an OEFS and/or an OES, such as for facilitating or optimizing providing explanation, obtaining feedback and using feedback from users, such as experts, for improvement, updating or optimizing operation of an OMLS.

Another technical problem has been to provide a continuously learning, stable and robust online machine learning system that is human understandable, or more, better, or more efficiently human understandable. Some embodiments provide technical solutions to that or related technical problems, which can include operation of an OEFS and/or an OES, such as for facilitating or optimizing providing explanation, and obtaining user, such as expert, feedback, which can include use of staged models, instance level and model level feedback and various user interfaces as described herein.

Figure 3A:
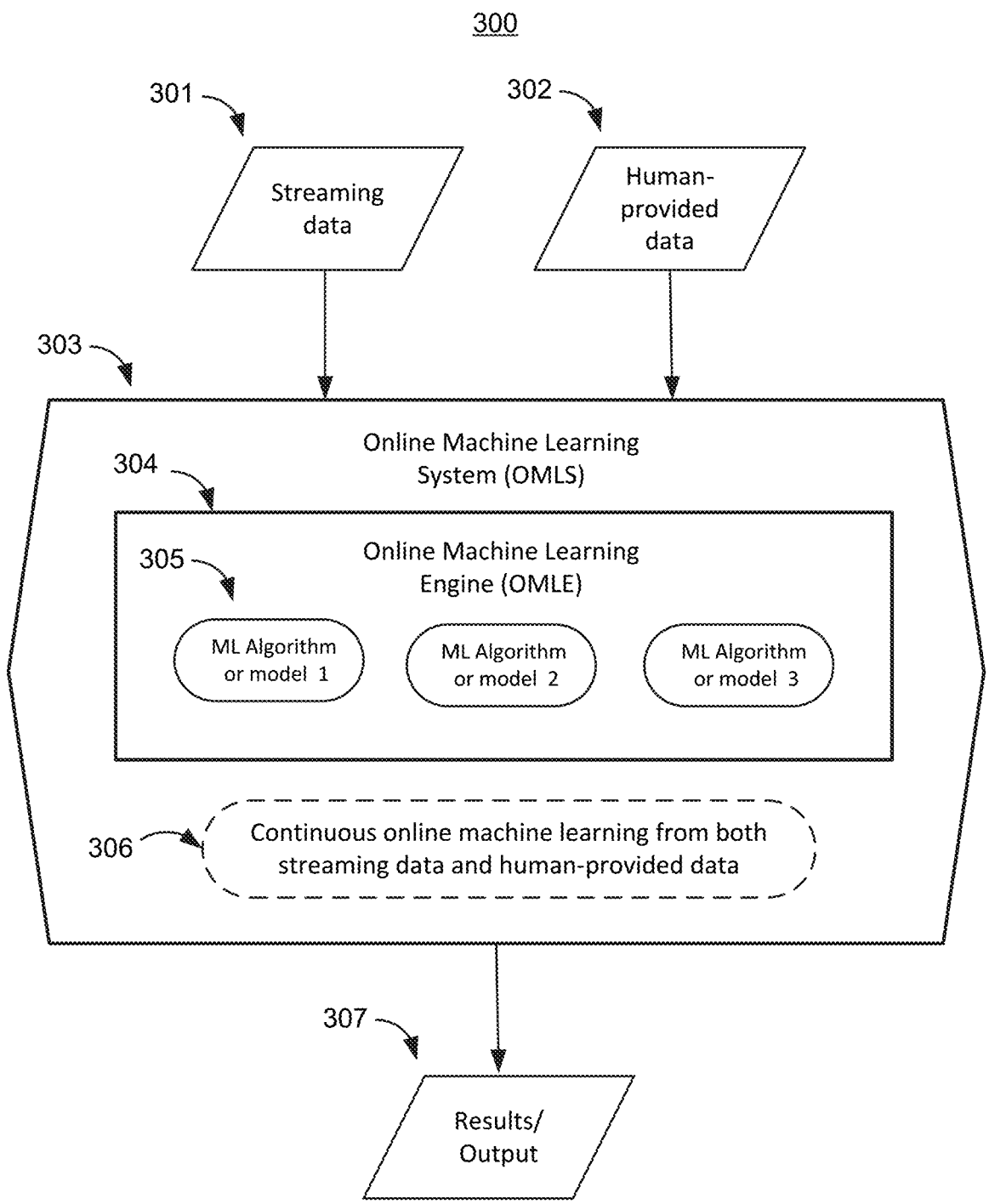
FIGS. 3A-3C illustrate block diagrams including an OMLS implementing methods according to embodiments of the invention.

FIG. 3A is a block diagram 300 depicting an OMLS 303 according to an embodiment of the invention. Streaming data 301 and human-provided data 302 are depicted. The streaming data 301 can be any form of data not human-provided. The human-provided data 302 can include any form of human feedback, such as a choice or decision, etc. The streaming data 301 and the human-provided data 302 are input to the OMLS 303 over time, and not necessarily in coordination with each other.

The OMLS 303 includes an OMLE 304. The OMLE 304 includes multiple machine learning algorithms and/or models 305. The OMLE 304 performs continuous online machine learning from both the streaming data 301 and the human-provided data 302.

The OMLS outputs result or output data 307, which may include, for example, among other things, prediction or prediction related data. In some embodiments, result or output data can flow in both directions.

Figure 3B:
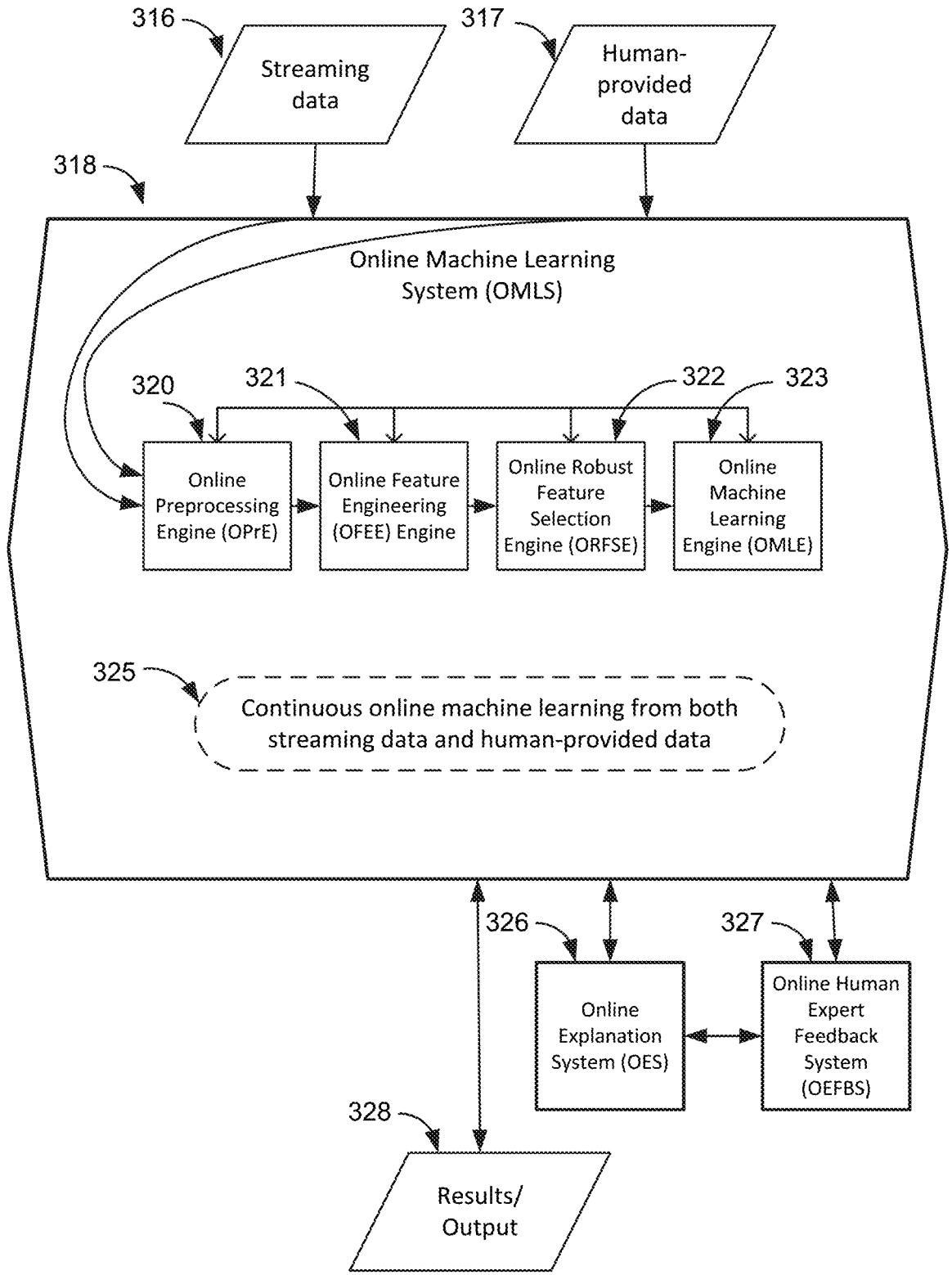

FIG. 3B is a block diagram 315 depicting an OMLS 318 according to an embodiment of the invention. Incoming streaming data 316 and human-provided data 317 are depicted.

As depicted in FIG. 3B, the OMLS 318 includes an OMLE 323 that includes multiple machine learning algorithms or models. The OMLS 318 further includes an OPrE 320, an OFEE 321 and an ORFSE 322, which contribute to the speed, accuracy, stability and robustness of the OMLS 318. As depicted, the OPrE 320, OFEE 321, ORFSE 322, and OMLE 323 are all in continuous communication with each other. However, in some embodiments, not every engine is in continuous communication with every other engine. As depicted, the OMLS 318 is in continuous communication with an OES 326 and an OEFBS 327. However, in some embodiments, the OES 326 or OEFBS 327 may be included as part of the OMLS 318. The OMLS 318 outputs result or output data 328.

In various embodiments, elements of the OMLS can exist or run on various types of devices, single or distributed, such as server(s), client(s), phone(s), laptop(s), etc. Furthermore, in some embodiments, an OMLS can operate in a distributed manner, for example, making use of the computing power of multiple devices or CPUs.

Figure 3C:
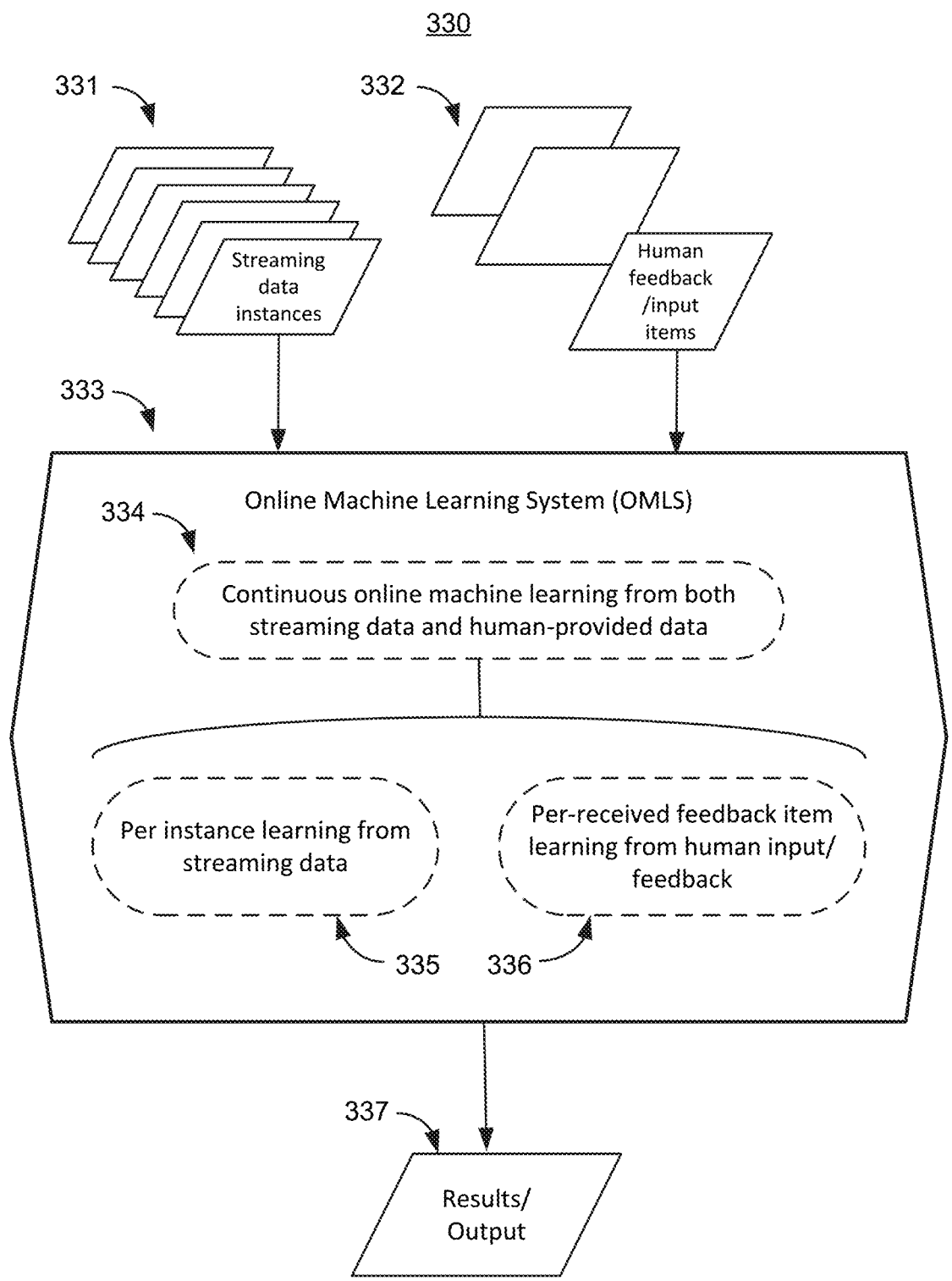

FIG. 3C is a block diagram 330 depicting an OMLS 333 according to an embodiment of the invention. Streaming data instances 331 and human feedback/input items 332 are input to the OMLS 333 over time, such as periodically, regularly, regularly or in some other way. The streaming data instances 331 and the human feedback/input items 332 do not necessarily come in to the OMLS in any coordinated way, in time or otherwise, with each other. In some embodiments, human feedback/input items 332 may be input when a user chooses, when alerted or prompted by the OMLS 333, or on other ways. In some embodiments or situations, an item can be an instance. Furthermore, in some embodiments or situations, an instance can be a compound instance including a set of instances that are subinstances of the compound instance.

As depicted at block 334, the OMLS 333 performs continuous online learning from both the streaming data instances 331 and the human feedback/input items 332. In some embodiments, as depicted at blocks 335 and 336, this includes per instance learning from the streaming data 331 and per-item learning from the human input/feedback 332. The OMLS 333 outputs result or output data 337.

Figure 3D:
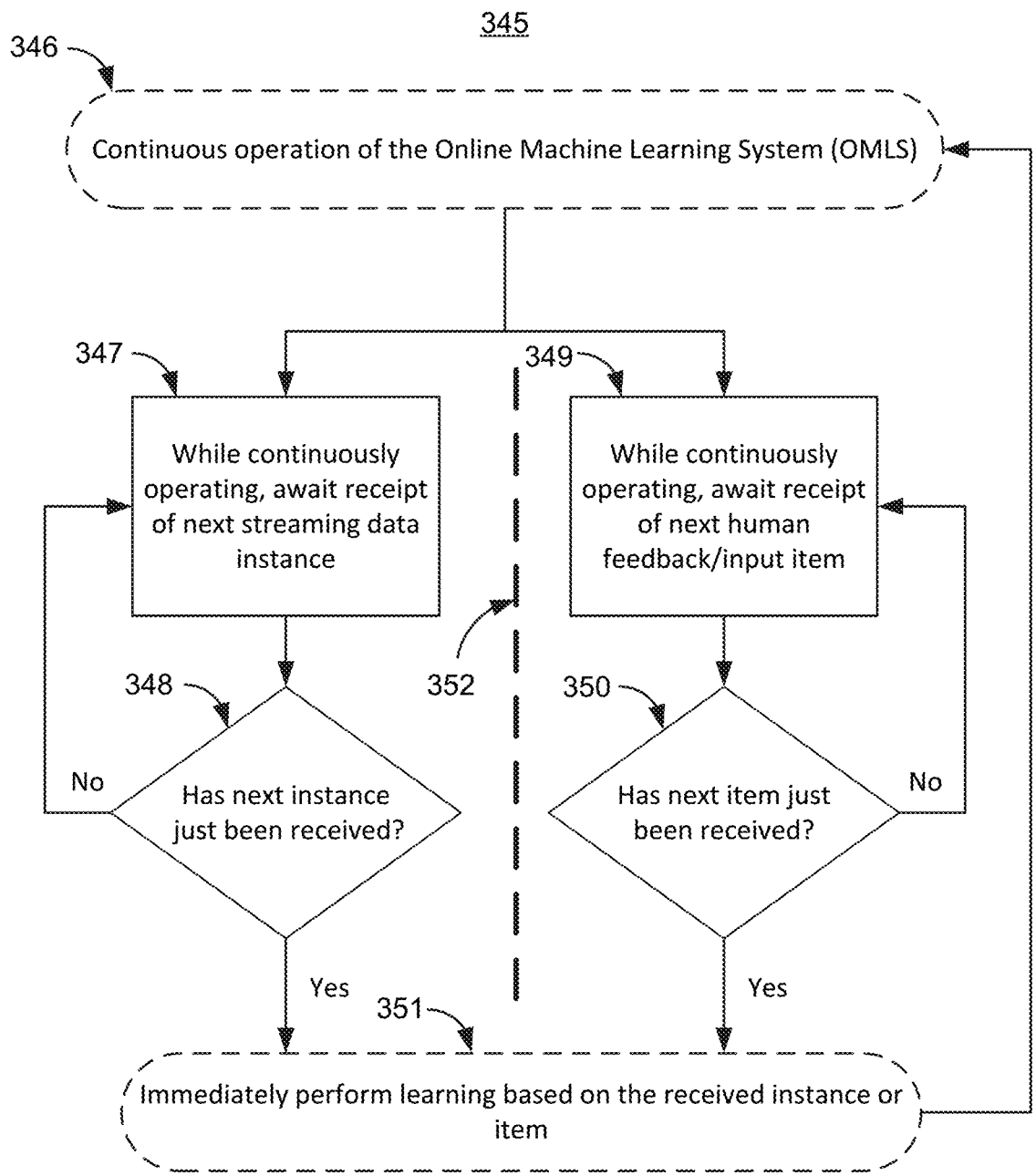
FIGS. 3D-3E illustrate flow diagrams of an OMLS implementing one or more aspects of embodiments of the invention.

FIG. 3D illustrates flow diagram of an OMLS implementing a method 345 according to an embodiment of the invention. Block 346 represents continuous operation of the OMLE, during which, and as part of which, operation of the other steps take place.

At step 347, while continuously operating, the OMLS awaits receipt of the next streaming data item. At step 348, if the next data item has not yet been received, the method 345 returns to step 347 and continues to await the next streaming data instance. At step 348, if the next data instance has just been received, the method 345 proceeds to step 351, at which the OMLS immediately performs learning, including any appropriate system updating or modification, based on the received streaming data instance.

At step 349, while continuously operating, the OMLS awaits receipt of the next human input/feedback item. At step 350, if the next human input/feedback item has not yet been received, the method 345 returns to step 347 and continues to await the next streaming data item. At step 350, if the next data item has just been received, the method 345 proceeds to step 351, at which the OMLS immediately performs learning, including any appropriate system updating or modification, based on the received human input/feedback item.

Broken line 352 is intended to signify that steps 349-350 continuously take place concurrently as steps 347-348 continuously take place. As such, continuous per-instance learning from streaming data instances takes place concurrently with continuous per-item learning from human feedback/input.

Figure 3E:
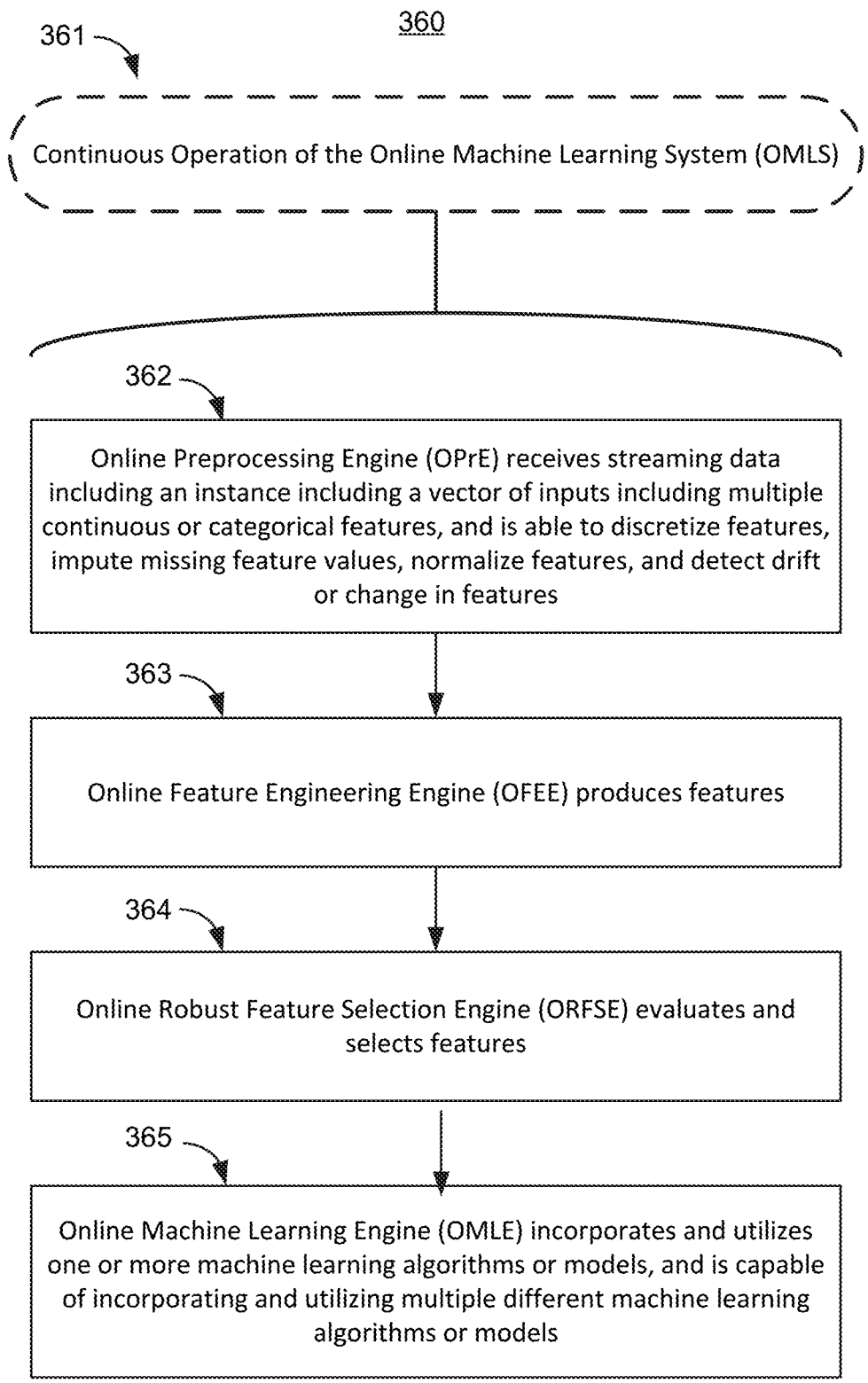

FIG. 3E illustrates flow diagram of an OMLS implementing a method 360 according to an embodiment of the invention. Block 361 represents continuous operation of the OMLE, during which, and as part of which, operation the other steps take place.

At step 362, an OPrE receives streaming data including an instance including a vector of inputs including multiple continuous or categorical features. The OPrE is able to, and may, discretize features, impute missing feature values, normalize features, and detect drift or change in features.

At step 363, an OFEE produces features.

At step 364, an ORFSE evaluates and selects features.

At step 365, the OMLE incorporates and utilizes one or more machine learning algorithms, and is capable of incorporating and utilizing multiple different machine learning algorithms or models.

1. A Continuously Learning, Stable and Robust Online Machine Learning System (OMLS), According to Some Embodiments.

The following, including all of this (Section 1), as well as the entire Detailed Description, describe some embodiments of the invention in an exemplary and non-limiting way.

A Continuously Learning Online Machine Learning System (OMLS) is a truly online learning system in the sense that it is able to learn a single instance at a time. The OMLS can be incrementally updated and hence can be up-to-date at any time t.

While embodiments of the invention are generally described herein as non-batch systems, some embodiments of the invention do work with or operate as, or partly as, batch systems.

In some embodiments, an instance comes into being depending on the business problem that is being solved by the OMLS. We define an instance as a vector of inputs, x, (columns, features) each of which can take numerical or categorical values and a corresponding actual label, r, (which could be empty for all (for the unsupervised problems) or some of the time (when label is not available at the time the instance is created). We assume that there is a dependence between inputs and/or the label modeled by an unknown function $f_t(x)$ which could be changing in time t. The goal of continuous machine learning is to create a function $g_t$ that approximates the unknown function $f_t$ as closely as possible at every time t. Each instance x (and r if there are labels) taught to $g_t(x)$ updates it and has the potential to change it. The instances could be taught to $g_t$ so that the error at any time t, the error:

$E(t) = \Sigma_{over\ all\ x, drawn\ from\ probt(x)}$ distance $(f_t(x), g_t(x))$ is minimized. Here, the input probability distribution, probt(x), could be changing in time as well as the label distribution (which is also called the prior for each class).

In batch (i.e. not continuous) learning, a function $g_{Ttrain}$ (x) is trained based on a collection of x's within a time period, $T_{train}$, with the assumption that actual unknown function $f_t(x)$ is not going to change for a period of time after $T_{train}$. In many cases, $f_t(x)$ continues to change with t, therefore the error of $g_{Ttrain}(x)$ with respect to $f_t(x)$ increases with time.

At the center of the OMLS is the OMLE (Online Machine Learning Engine). The OMLE consists of an ensemble of online machine learning algorithms that produce stable and robust results.

The OMLS contains an Online Preprocessing Engine (OPrE) module, where features are normalized, discretized and also imputed for missing values and drift or change in features or labels is also detected.

The OMLS takes as inputs the features produced by an Online Feature Engineering Engine (OFEE). The OFEE, which could just implement the identity function, transforms the original inputs x to the engineered inputs z. The features z aim to help the OMLS to be able to learn the underlying target function better.

The OMLS also contains an Online Robust Feature Selection Engine (ORFSE) module where all the features are continuously and robustly evaluated in terms of how relevant they are for the particular machine learning task.

Each component of the OMLS, OPrE, OFEE and ORFSE and also each algorithm within OMLE, have to be able to operate continuously and communicate with each other continuously. When one of the components in this pipeline changes, the system down the stream has to be able to continuously function without interruption (see 1.1.3, 1.1.4 and 1.1.5.).

OPrE, OFEE and ORFSE help with the overall time and accuracy performance and also stability and robustness of the OMLS.

Figure 4:
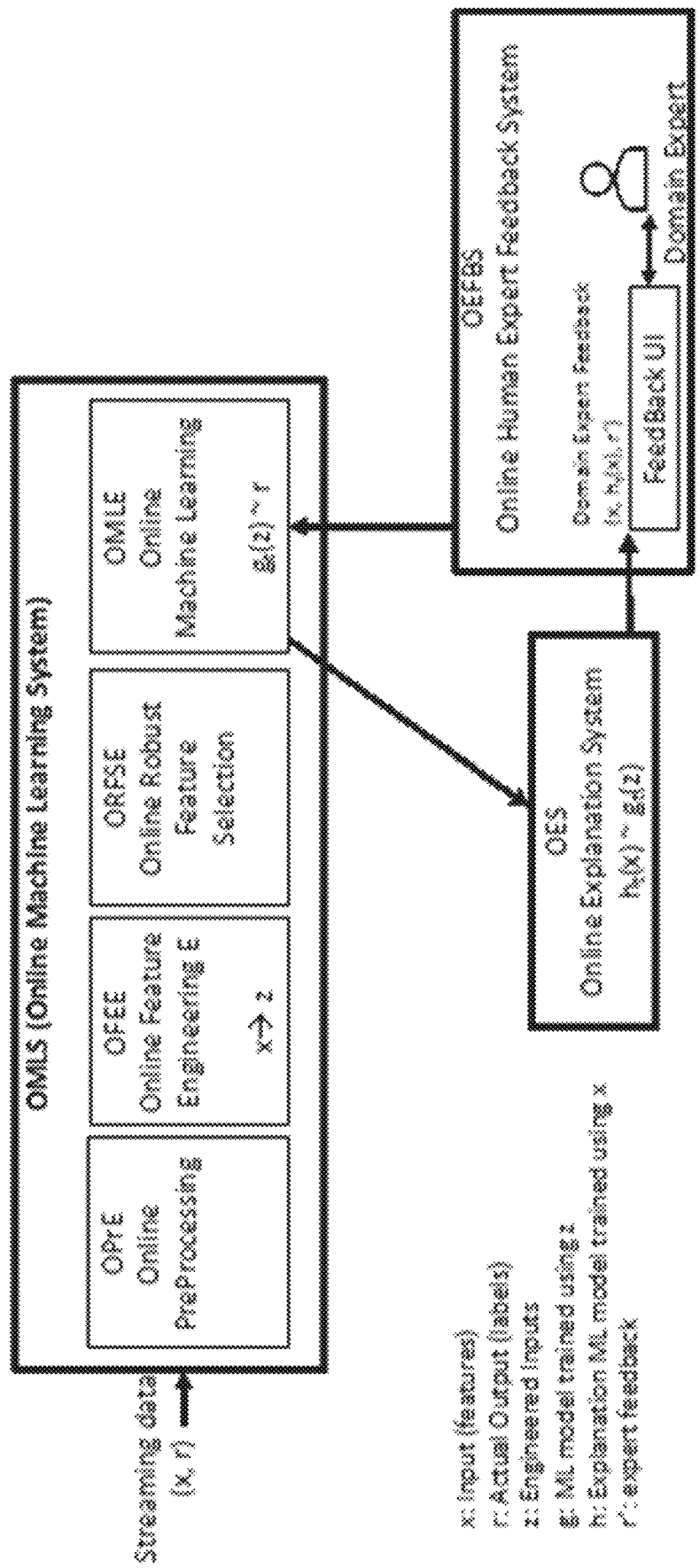
FIGS. 4-6 illustrate architecture diagrams of one or more aspects of an embodiment of the invention.

FIG. 4 shows Online Machine Learning, Model Explanation and Expert Feedback System overview 1.1. The OMLS contains the Online Machine Learning Engine (OMLE) which implements a function $g_t(z)$ that aims to approximate the labels r (supervised learning). OMLS may also be able to learn when labels are not at all available (unsupervised learning) or labels are available on demand or some of the time (semi-supervised learning). OMLS may consist of a single model or an ensemble of machine learning models whose outputs are combined. The combination can be performed, for example, linearly with weights based on the performances of the models on the online machine learning problem or predetermined weights. Combination can also be performed by means of a stacking model which itself is a machine learning model [Alpaydin, E. (2014). Introduction to machine learning. MIT press].

1.1.1. Performance Measurement of the Online Machine Learning System

When the OMLS outputs results, usually there are actions taken based on the outputs of the OMLS. For example, the customers' churn scores, fraud scores etc. could be computed using the OMLS. The business people might take actions to prevent churn and hence a customer who was predicted to churn might actually not churn due to actions taken based on OMLS prediction. In order to be able to correctly measure the performance of the OMLS in such environments, we use a testing methodology as follows:

Order the instances in decreasing order, according to their confidences in the class of interest (for example, will-churn).

TopKInstances: Based on the operational capability of the business (for example the number of customers that can be contacted in a day), select instances whose confidence is above a threshold or the top k % of instances.

TopKInstancesForMeasurement: Randomly select m % (for example 5%) of the TopKInstances and do not take any actions on these instances.

Let the business take actions on the set of instances in the set TopKInstances–TopKInstancesForMeasurement.

PerfNoAction: Measure the performance of the OMLS on TopKInstancesForMeasurement. The performance value (E) can be, for example, accuracy, top-k performance, equally weighted or weighted accuracy, precision, recall, f-measure for the classification problems and mean absolute error, mean squared error etc. for the regression problems.

PerfAction: Measure the actual occurrances of the label (for example will-churn) on TopKInstances–TopKInstancesForMeasurement Report the PerfNoAction (which shows the performance of the OMLE) together with PerfAction (which shows the effectiveness of the actions taken by the business to prevent the predicted outcome).

In addition to the traditional performance measurements, the OMLE can also operate based on the business benefit performance (PerfBusiness). In order to measure the business performance, first of all the business benefit value of each predicted instance is determined. For example, if the output is whether an insurance customer will churn or not, the benefit value could be a certain percent of the annual payment of the insurance customer. Similar to PerfAction and PerfNoAction the business related measurements PerfBusinessAction and PerfBusinessNoAction are also measured and reported.

Based on the PerfNoAction and PerfBusinessNoAction, if some classes need to be learned better than the others, the weight given to a particular class or a particular set of instances is adjusted by the OMLE using the methods outlined in Section "1.1.3. OMLS with class and instance weights". Since ensembles of machine learning methods are used, the ones that survive could be decided based on their performance values (see: 1.1.4. OMLS with continuosly optimized and selected multiple models). Note that the current invention describes methods that allow the OMLS to run continuously even when/while changes occur (see 1.1.5. Robustness to Feature Deletions or Additions).

PerfAction and PerfBusinessAction can be compared with PerfNoAction and PerfBusinessNoAction to determine the effectiveness of the business actions. If the business processes do not allow acting on a separate set of customers, the PerfNoAction could be measured by means of operating a random or currently used method at different and close time intervals to the time the OMLS is used.

In addition to accuracy and benefit performance, throughput performance (time it takes to predict and train each instance) of the OMLS is also continuously measured. Drift and anomaly detection methods, such as CUSUM (Cumulative Sum), GMA (Geometric Moving Average), hypothesis testing methods, Kolmogorov-Smirnov test, DDM (Drift Detection Method), EWMA (Exponential Moving Average) [Bifet, Albert, and Richard Kirkby. "Data stream mining a practical approach." (2009)] can be used on the time measurements and if there are anomalies (either too slow or too fast predictions) alerts are produced. If the system takes longer to produce results than can be tolerated by the business, actions can be automatically taken on the OMLS system components. These actions can be, for example, favoring simpler or smaller number of models in the OMLE, eliminating some time-consuming processes or dropping some instances in the OPrE, simplifying some of the operations at the OFEE or allowing more features to be filtered out at the ORFSE or sometimes dropping some instances.

1.1.2. OMLS with Business Actionable Features for Optimal Business Actions

PerfAction and PerfBusinessAction can be used to measure the effectiveness of business actions that were taken. On the other hand. OMLS can be used to suggest the effective business actions for each instance as follows:

(1) Determine the business actions that can be taken when the OMLS outputs its predictions.

(2) Determine the parameters of the actions (e.g. if the action is call center calling the customer who would churn, who called the customer, at what time, what product change/discount was offered to the customer, which information was provided to the customer, and the like)

(3) For each predicted instance, include the action parameters and whether the customer exhibited the predicted behaviour or not as inputs to the OMLS.

(4) The OMLS can now predict not only if the customer is likely to exhibit the class of interest, but also which of the actions taken are useful to prevent the exhibition of the class.

(5) Given the cost of each action and the OMLS with Business Actionable Features, by means of trying each action, suggest the optimum set of actions to the business.

1.1.3. OMLS with Class and Instance Weights.

In order to make sure that classes are learned by the OMLS in proportion to their importances, assign a class-weight to each class. For example the minority class (e.g. anomaly) could have more weight than the others.

Instance/class weighting can also be implemented by means of up/downsampling of instances from a particular class or particular set of instances. This method has the advantage of not requiring a change on the OMLS, however, it might take longer or may perform poorer than treating instance/class weights within the OMLS components.

When presenting instances to the OMLS, if the instance to be trained on is from the class with more than 1 as the instance weight, then the model updates in the OMLE are performed taking into account the class weight of the instance. The other modules in the OMLS also apply the required instance or class weights. The OPrE uses the weights when computing the measurements for imputation, discretization, normalization procedures or change or drift detection procedures. The OFEE utilizes the instance/class weights for feature engineering computations. The ORFSE uses the instance/class weights to measure the feature relevances.

The machine learning disclosed continuously learns and it can learn from both batch data as well as streaming data sources. If there is already existing batch data, the machine learning models can be trained on that data. Especially if the machine learning problem is a classification (e.g. anomaly detection) task where some labels might appear much less than the others, during batch training, data that is fed to the machine learning system may need to be processed (such as shuffling the instances, downsampling the more frequent instances, passing the datasets through the machine learning system more than once, emphasizing the instances less learned more at the next iteration of learning.)

1.1.4. OMLS with Continuosly Optimized and Selected Multiple Models

While each machine learning algorithm within the OMLE learns, they can be trained according to different criteria. For example, some models in OMLE may have different rates of forgetting the past, some may be freshly trained starting at a certain point in time, some models may have different hyperparameters.

While each machine learning model in the OMLE learns in time, their individual accuracy, business benefit, and throughput performance are continuously measured. The models that perform worst are eliminated. A new model is generated and its parameters are selected probabilistically based on the performances of the existing models as follows:

(1) For each existing model $m_i$, keep track of the model type, class weights, hyperparameters, and any other parameter that effects the training of the model.

(2) Assign a probability of selection ProbSelectioni to model $m_i$, proportional to its accuracy, business benefit and throughput performance. This performance can be measured either overall or within a certain past time window. For the computation of the ProbSelectioni, accuracy, business benefit and throughput performances of model $m_i$ can be weighed based on business preferences.

(3) Randomly select a model $m_j$, based on the ProbSelection.

(4) Initialize the new model, $m_K$, with the type, class weights, hyperparameters, etc. of $m_j$.

(5) $m_K$ will start training with fresh data from the time of its creation.

Instead of a single model $m_K$, multiple models can also be included in OMLE.

Creation of new models as above will increase the robustness of OMLE. It will also allow optimization of the data scientist time spent on finding out the best parameters for the machine learning models.

Since different algorithms are continuously trained, the outputs of those algorithms can be combined in different ways (such as, switching, average, running performance weighted average, confidence weighted average, time performance weighted average, stacking classifiers).

Similar to the models in the OMLE, the components OPrE, OFEE and ORFSE may be operated in different settings, resulting in different preprocessed, engineered and selected features. In the current invention, all the parameters within OPrE, OFEE and ORFSE modules are recalculated in parallel to the currently active parameters and when there is enough change in their values, the updated values are activated throughout the OMLS components. This update can also be triggered through an external signaling mechanism.

In order to achieve scalable algorithms, the instances can be fed into different algorithms at the same time (broadcasted) or they can also be load-balanced among algorithms, allowing the instances to be processed faster. Different parts of algorithms can also be distributed to different CPUs, GPUs or machines to improve the system's throughput performance.

1.1.5. Robustness to Feature Deletions or Additions:

Feature additions or deletions are a fact of life. Both need to be handled so that the OMLS can operate continuously.

Figure 5:
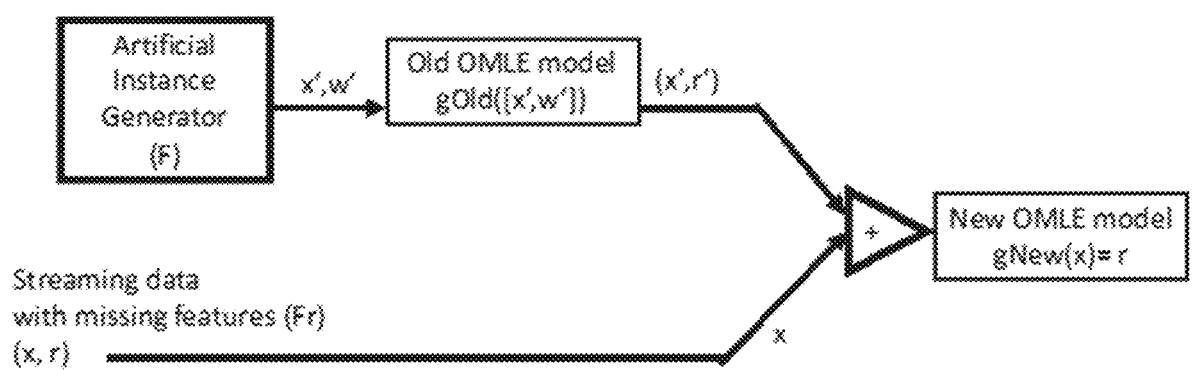

Let F be the set of all features. Assume that a set of features $F_m$ is or will be totally or mostly missing. Let $F_r = F - F_m$ be the remaining features. First of all, for each model in the OMLE that uses features from $F_m$, we create a new fresh machine learning model initialized and trained with the features from $F_r$. In order to be able to get most use of the already trained models, we use an artificial instance generation mechanism and use the already existing models in OMLE as teachers to the new corresponding models (FIG. 5). The artificially generated input (F) is fed to the old model and the label is recorded (x',r'). The Fr part of the features, together with the predicted label is fed as a training instance to each new corresponding model. The new models are also trained on the incoming new data. When the new models' performances have reached a certain level (e.g. close enough or better than to the old ones' performance), the old models in the OMLE are replaced by the new models and are continued to be trained on the fresh data.

FIG. 5 shows training of a new model when some features become permanently missing, using the artificially generated instances and the old model as well as the new data.

If a set of new features become available, then a fresh model is trained with instances containing those new features as well as the old existing ones. Only when the performance of the new model is good enough (according to the performance criteria mentioned above) one of the already existing classifiers, possibly with less features is replaced with the new one.

1.2. Online Preprocessing (OPrE) Module

The OMLS contains an Online Preprocessing Engine (OPrE) module, where features are normalized, discretized and also imputed for missing values, and drift or change in features or labels is also detected.

Online Feature Discretization:

Discretized feature values are presented to the machine learning models in addition to the original feature values. Discretization allows the machine learning models to be more robust, because instead of absolute feature values, only the bin identities (e.g. 0: low, 1: high) are given to the machine learning models. Although the real values may fluctuate, the behavior of the machine learning model depends on its discretized low/high input, making it more robust, especially if data keeps changing continuously.

Discretization of continuous (i.e. numerical) features is performed in different ways, such as: equal spaced (divide the range between min and max values to equal width intervals), uniform (each interval has approximately the same number of instances in it), or relevance-based discretization. In relevance-based discretization, discretization boundaries are selected using the joint distribution of the feature values with the label values, taking into account the cost of label confusion errors, such that the feature relevance post discretization is maximized. As more data is received, discretization boundaries are updated.

When a categorical feature takes many (for example thousands of) values, training of the models with that feature by means of encoding the feature using traditional methods, such as 1-of-K (also called one hot) encoding may cause addition of a lot of features and may cause the models to overfit the data and also not be interpretable. In order to prevent this, we discretize the categorical features into a smaller number of values. If there are M classes, we produce M integer valued features. Let x denote the categorical feature and $x_j$ a value that the feature takes. Based on the data that has been observed up to now, we compute the $Prob(x_j|C_i)$ for each class $C_i$ and feature value $x_j$. We discretize these probabilities into integers within a certain range. $Prob(x_j|C_i)$ computation can be performed in different ways, for example, on all the data, on the latest set of observations over a moving or fixed window, or by means of giving less weight to instances that have been observed in the past. Whenever the input contains the feature value $x_j$, we produce M integer features that can be used in place of the feature.

Machine learning models in the OMLE can be trained simultaneously based on different forms of or no discretization and the algorithms that perform better could be kept while the worst performing algorithms could be replaced by the other alternatives.

The discretization of features can also be performed based on the preferences of the domain experts. The domain experts may give feedback on if a feature should be treated as a discrete or continuous variable, determine the discretization bounds, the details of how the many valued discrete features are discretized for example the $Prob(x_j|C_i)$ computation or whether some values of features could be evaluated under the same value such as "other" category.

1.3. Online Feature Engineering Engine (OFEE) Module

The OMLE takes as inputs the features produced by an Online Feature Engineering Engine (OFEE) module. The OFEE, which could just implement the identity function, transforms the original inputs x to the engineered inputs z. The features z aim to help the OMLE to be able to learn the underlying target function better.

Figure 23:
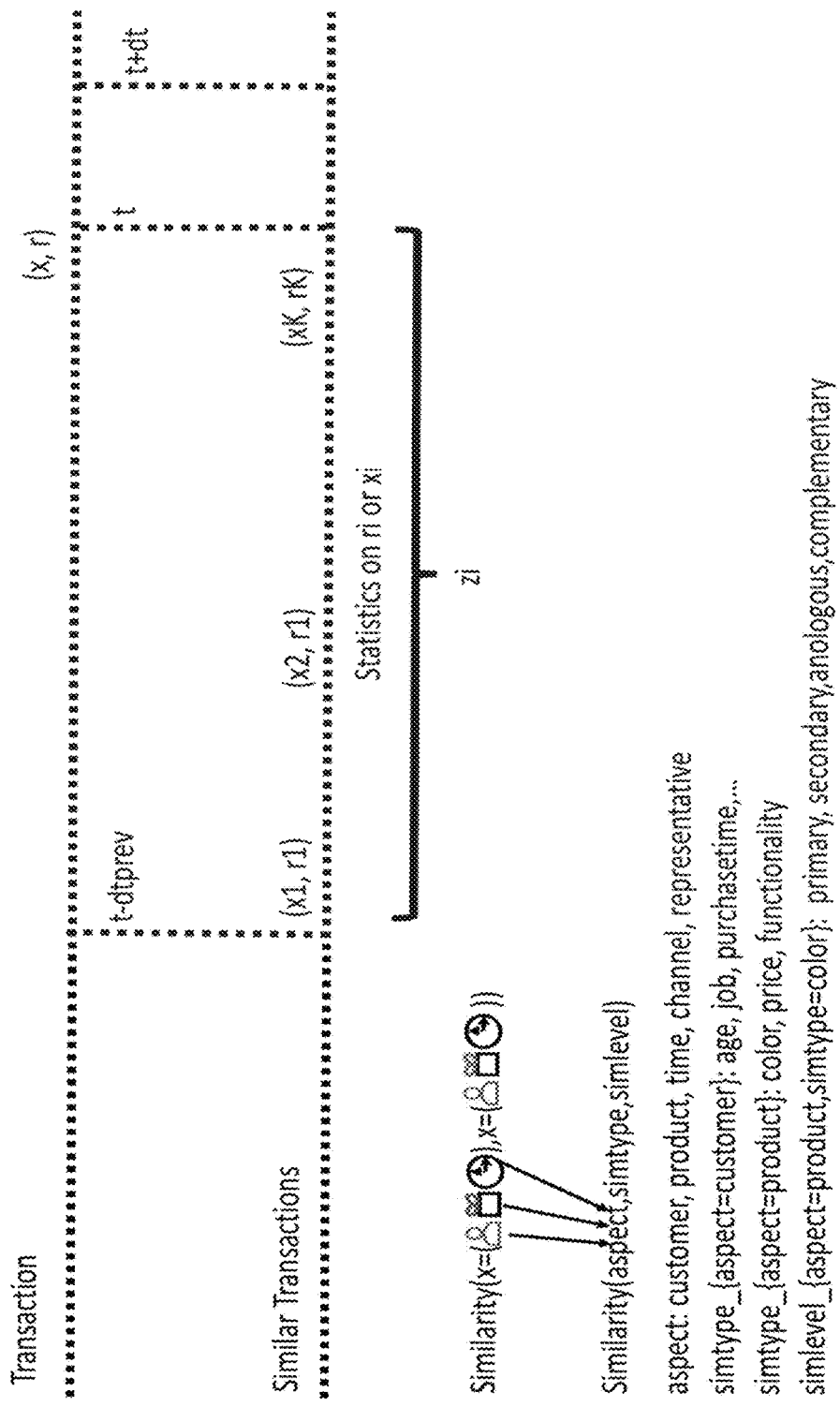
FIG. 23 illustrates a graphical diagram relating to one or more aspects of an embodiment of the invention.

FIG. 23 illustrates a graphical diagram relating to one or more aspects of an embodiment of the invention, including aspects of an OFEE.

OFEE computes different functions, such as statistics (min, max, mean, standard deviation, skewness, kurtosis, mode, histogram), log, square, exponent, same-as-count, similar-count, unique-count, etc. on labels or features of particular sets of instances observed over a given time interval. The time interval could be before, after or overlapping the time that the particular instance x was observed.

It also computes functions such as log, ratio, difference, sum, similarity, and the like between feature pairs or sets (especially most relevant features) of the same instance or between the observed instance and a particular set of instances or between a particular set of instances. More complex transformations such as FFT, wavelets, etc. over sets of instances could also be used.

Structured features such as Datetime and URI are processed by the OFEE. For example, Datetime features are broken down into components such as day-of-week, day-of-year, day-of-month, etc. URIs are broken down into scheme, host, domain, path etc. parts.

When x is an instance which is a transaction (a transaction instance) made of different aspects, such as customer, product, time, channel, representative, the set of instances related (similar) to x can be retrieved and the functions mentioned above can be computed on that set of instances. There can be labels, r, with each instance x, and these labels can be obtained at time t (detection) or dt time-period after time t (prediction).

Similarity functions can be defined for each aspect separately.

For example:
transactions of the same customer within the last week.
transactions of similar customers (e.g. customers who live at the same address) within the last week.
Similarity functions can also be defined combining different aspects. For example:
Transactions of similar customers (e.g. customers who live at the same address) and with the similar product color (e.g. blue shirts)

For each aspect (e.g. customer, product, time, channel, representative) different types of similarity can be defined. For example, for product aspect, similarities of type color, price, functionality can be defined.

For each similarity type, different levels could be defined. For example, for the product aspect and color type, primary, secondary, analogous, complementary could be different levels. Aspects, types and levels could be obtained from customer defined segments or hierarchies. They could also be extracted from the existing transactions by means of frequent pattern mining algorithms.

1.4. Online Robust Feature Selection (ORFS) Module

The OMLS also contains an Online Robust Feature Selection (ORFS) module where all the features are continuously and robustly evaluated in terms of how relevant they are for the particular machine learning task.

Based on the preferences of the domain experts, some features can be included or excluded (ignored) from the models.

Mutual information or other correlation based measures can be used to measure relevance. The correlations between the most relevant features can also be computed. The relevances or correlations are computed online, through updates to the statistics used for relevance computation by the new instances.

In order to evaluate the feature relevances in a robust way, the t-test is used as follows. The relevance value (correlation with the label) is computed. Then for a number of times, the labels are shuffled and the relevances are computed with the shuffled labels. Statistics, such as the sample average, mode and the standard deviation of the shuffled relevances are computed. Only if a statistical significance test, such as the t-test (with a certain confidence value) accepts that the relevance computed is more than the shuffled relevance, then the feature is deemed to be relevant. Otherwise, the feature relevance is set to be zero.

2. An Online Machine Learning System (OMLS) that is Human Understandable

The following, including all of this section (Section 2), as well as the entire Detailed Description, describe some embodiments of the invention in an exemplary and non-limiting way.

2.1. Online Explanation System:

Even if complex machine learning algorithms are used, when they need to act on the results of the machine learning models, human experts need to understand the reasons behind the machine learning outputs. In most domains, experts are used to rule based systems where the model (and its explanation) consists of a set of conjunctions of input features or linear models where the output consists of a weighted average of the inputs.

In order to explain machine learning models, approaches such as LIME or Shapley [Lundberg, S. M., & Lee, S. I. (2017). A unified approach to interpreting model predictions. In Advances in Neural Information Processing Systems (pp. 4765-4774)] have been used. These explanation methods are used for batch machine learning systems and are inefficient since they require new explanation systems built for each instance to be explained.

The current invention includes an Online (model) Explanation System (OES) that learns continuously while the online machine learning system (OMLS) keeps being updated based on the data stream and also according to the initial and changing preferences of the human domain experts.

Let x denote the original features which the domain expert knows about and z denote the combination of the original and engineered features. While OMLS keeps learning continuously, its output $g_t(z)$ is taught to an ensemble of simpler explanation machine learning models, such as online decision trees or linear models. The explanation machine learning models $h_r(x)$ are trained using x, so that they are understandable by the human experts. In addition to x, features from z that are human understandable can also be included for training the explanation model.

Figure 6:
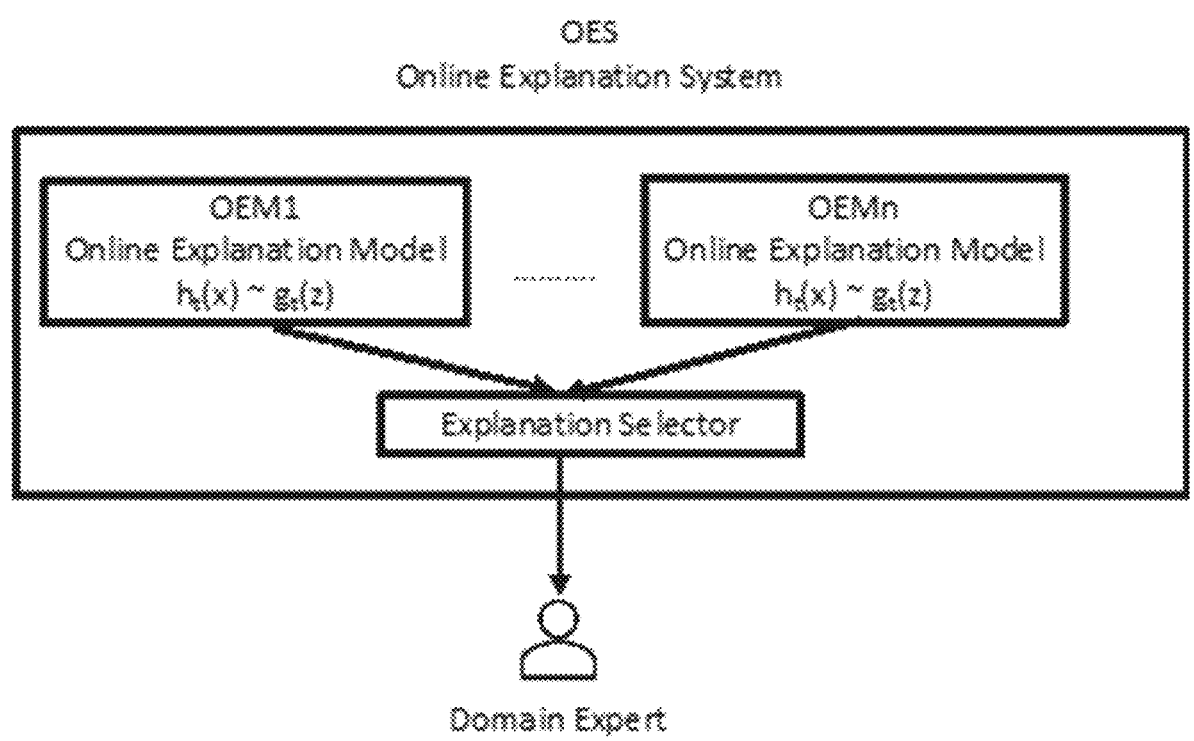

The explanation models aim to i) approximate the predictions of the OMLS, i.e., $h_r(x) \sim g_r(z)$. They need to be ii) understandable by the domain experts. They also need to be iii) trained continuously since the OMLS keeps learning and hence changing. In order to achieve these three criteria the OES consists of a continuously updated set of one or more Online Explanation Models (OEMs) (See FIG. 6). The Online Explanation Models learn the complex relationship between the features and the predicted outputs and they keep learning while the internal machine learning models change.

In order to achieve human understandable models, the current invention allows the automated selection of the features used for model explanation to have more meaning to the domain experts. Let the original features in x (FIG. 4) be $F_1, \ldots, F_d$, we will use $v_i$ (in [0:1]) to denote the preference of the domain expert for feature $F_i$. Let relevance of feature $F_i$ with respect to the current problem OMLS is being trained on (r) be $Rel_i$, the initial values of $v_i$ are set to be $Rel_i/sum_j Rel_j$, so that they are proportional to the feature relevances. The domain expert can manually update $v_i$. If there are already existing systems (such as rule based or other machine learning systems), the $v_i$ can also be initialized based on the importances of features in that system. The current invention includes a system to update the feature explanation weights, $v_i$, automatically based on the human domain expert's actions.

In order to achieve iii) Each of the OEMs are continuously trained on a subset of the original features x. The feature subset for each OEM is randomly selected based on the initial values of the feature explanation weights $v_i$. The OMLS LEARNS BASED ON THE ENGINEERED FEATURES $E_1, \ldots, EE$, DERIVED FROM THE ORIGINAL FEATURES $F_1, \ldots, F_d$. The explanation weight $v_i$ for the original feature $F_i$ is updated based on a function, such as weighted average, of the feature importances or relevances of features in the engineered features that use the feature $F_i$. The $v_i$'s are updated continuously, when the distribution of $v_i$ changes, new OEMs are added to the OES. The OEMs can be restricted to be simpler or more complex based on the needs of domain expert.

The OEMs may be trained not on all the instances that are outputted by the OMLS but a subset of them. For example, for anomaly detection problems, if the prediction is anomaly the OEMs are trained with that instance and if it is not, then the OEMs are trained with the instance with a certain probability. If the instance is not explained well by the OEMs (i.e. error($h_r(x)$, $g_r(z)$) is large) then it might be taught to the OEMs with a higher weight. If the confidence of the output $g_r(z)$ of the OMLS is low the instance might be taught with a lower weight.

The original feature explanation weights, $v_i$, used for initializations of the OEMs are updated based on the reactions of the domain expert to the alerts presented or the instance level or model level feedback the domain expert presents. The OEMs that contain features whose feature explanation weights are lowest are deleted from the OES.

The explanation selector selects the OEM that has the smallest explanation error and also contains the features that have the highest weight $v_i$ which are updated based on the expert feedback choices. Selection could be made based on a weighted average of accuracy and feature weights.

In order to achieve high accuracy model explanation, the error between the OMLS output and the model explanation needs to be minimized. In order to achieve model explanation with smallest error, the OEMs with the smaller error (and features with larger domain expert preference weights $v_i$) are utilized for the feedback UI.

In order to further reduce the model explanation error, a number of best performing OEMs are allowed to have children OEMs that are trained hierarchically as follows: The first level OEM, is the most general model explainer, and it aims to explain all instances. Therefore it is trained with all the outputs of the OMLS. In order to reduce the model explanation error, a set of other children OEMs are trained on close instance subsets with high explanation error. In order to get close instance subsets, a method could be to use an online decision tree for model explanation and get the instances that fall to the neighboring leaves with higher model explanation error. New $2^{nd}$ level OEMs are trained with those instances. $3^{rd}$, $4^{th}$ and so on explanation models can be employed based on how detailed and accurate explanations are needed by the domain expert.

FIG. 5 shows an Online Explanation System 2.2. Instance and Model Level Explanation and Feedback Interfaces The domain expert is presented with the results of OES through a user interface (Feedback UI, FIG. 4). The feedback UI consists of a number of interfaces where the domain expert is presented with the results of the OES and OMLS.

For example, the alert screen (FIG. 13) presents new instances that the domain expert needs to be alerted about. Each alert is accompanied with the explanation for that alert instance. The instance level feedback screen (FIG. 14) allows the OES and OMLS to present instances for which the expert feedback would help OMLS learn the most. Both alert and instance level feedback screens allow the user to examine the features and their relevances for each instance, the explanation of why the machine learning decided for the predicted label in terms of the features understandable by the user, all the features for the specific instance, the confidence of the OMLS prediction. These user interfaces also allow the human domain expert to provide feedback to the OMLS with the touch of a button. The user interfaces are easy to understand because they ask for an approval or rejection of the OMLS decision along with an explanation of the decision, and hence the human domain expert does not need to be a data scientist to provide feedback and steer the OMLS.

The model level feedback screen (FIGS. 16-20) allows the domain expert to teach the machine learning models by updating the OEM. Through the visual display of the explanation model, such as for example sunburst as in FIGS. 16-20, the user is able to understand how the machine learning has decided on its predictions in different regions of the input space and also provide model level feedback.

Figure 7:
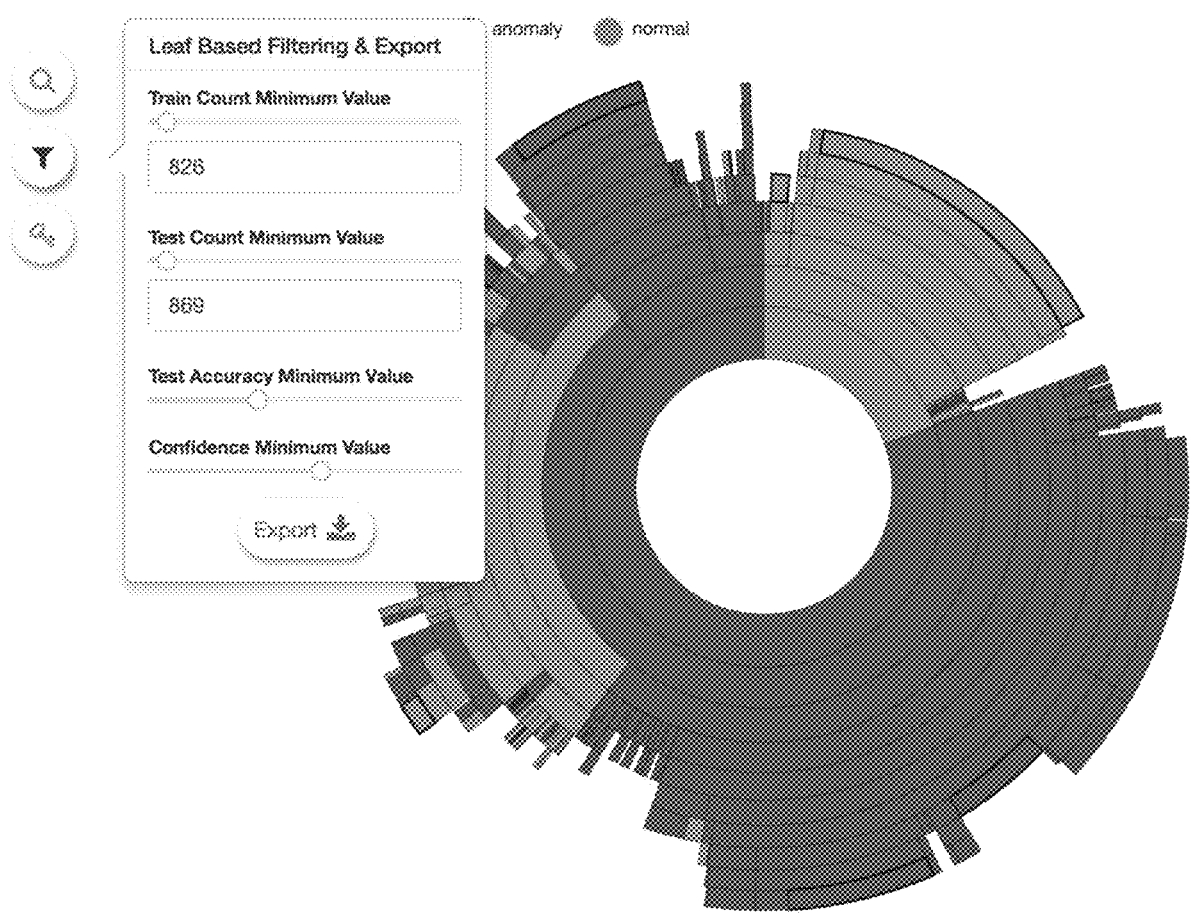
Figure 8:
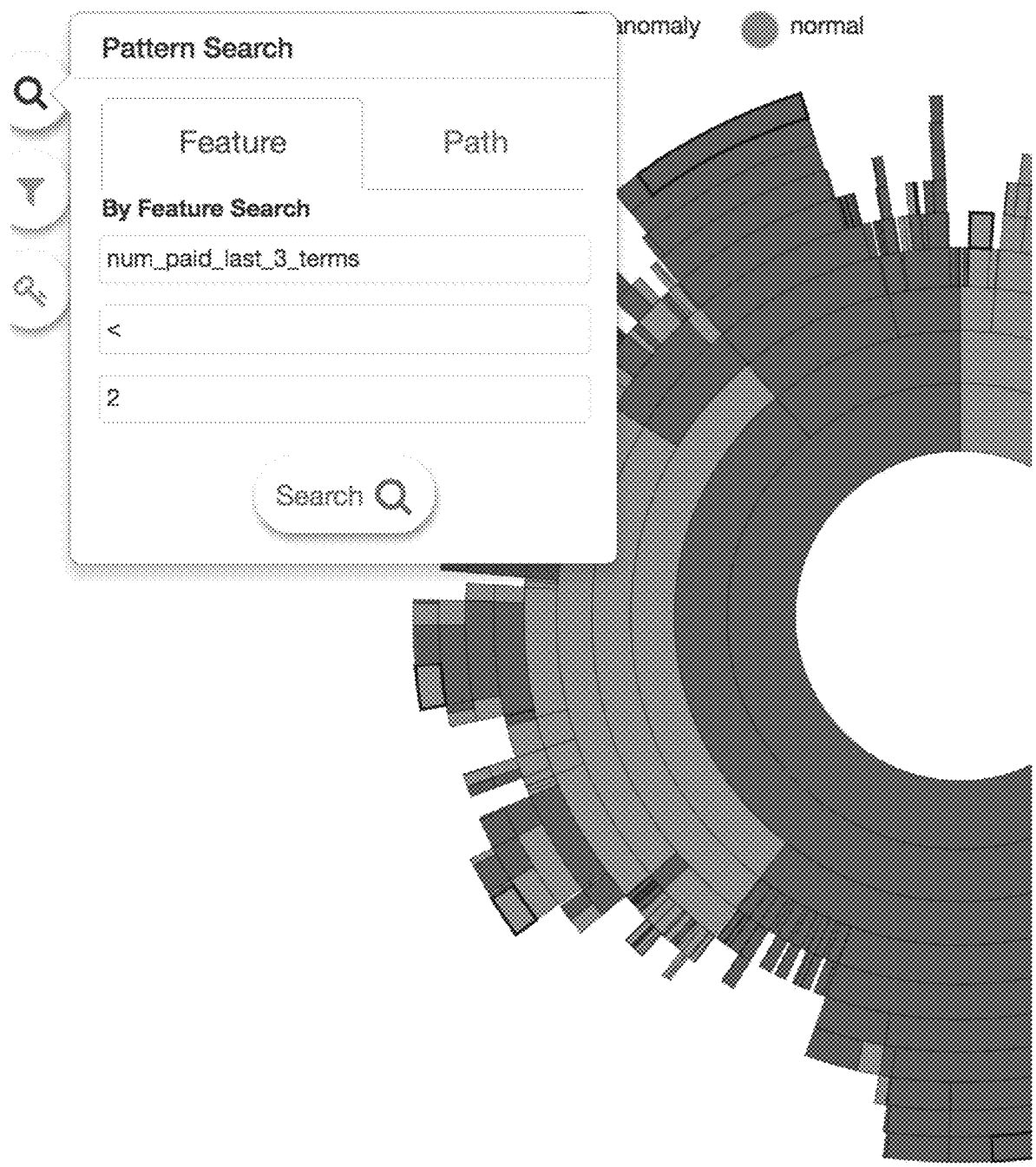
Figure 9:
Figure 10:

The user is able to better understand the model explanation through the user interface elements shown in FIGS. 7-9. and FIGS. 10-11. In FIGS. 7-9, the user can navigate, filter and search through the model explanation easily. In FIGS. 10-11. the user can export the pattern for a particular node. The user can also examine and export (for example the most recent) instances and their actual and predicted labels that fell into a particular node.

FIG. 7 shows the user being able to concentrate on the more accurate or densely populated parts of the explanation model by means of filtering those parts. FIG. 8 shows the user being able to search for specific features or paths (patterns) in the explanation model. FIG. 9 shows the user being able to visualize the model weighted by the number of training or test instances that fell into each node.

FIG. 10 shows the user being able to copy the pattern for a particular node on the model explanation (for example: num_terms_paid<37 & total_contribution_interval=1K-10K & . . . ) so that s/he can use it for reporting or other purposes.

FIG. 11 shows that without writing any code, among a set of instances (for example the most recent ones) the user is able to examine and export the instances that fell into a particular node.

2.3. Dynamic Significant Patterns on the Model Explanation

A significant pattern (FIGS. 7-9) is defined as the pattern for a node (insight, rule, path in a decision tree), for which the impurity for the node (and its siblings if possible) is much smaller than the impurity of the immediate parent or one of the grandparents. In order for the pattern to be significant, the corresponding node has to have at least a certain number $N_{thresh}$ of instances.

We measure the number of instances and the probability of the class(es) of interest for the node with the significant pattern and its parent or siblings, based on different intervals of the dataset in time.

An emerging pattern is a pattern that became significant over the most recent N time periods.

A diminishing pattern is a pattern that became less significant over the most recent N time periods.

A robust/ongoing pattern is a pattern which is significant for the most recent N time periods.

The emerging and robust patterns signify the business opportunities to be considered. In order to be able to catch the emerging patterns, the instance threshold $N_{thresh}$ can be kept lower. The nodes that do not have significant patterns could be analyzed further to detect for example business cycles.

Figure 12A:
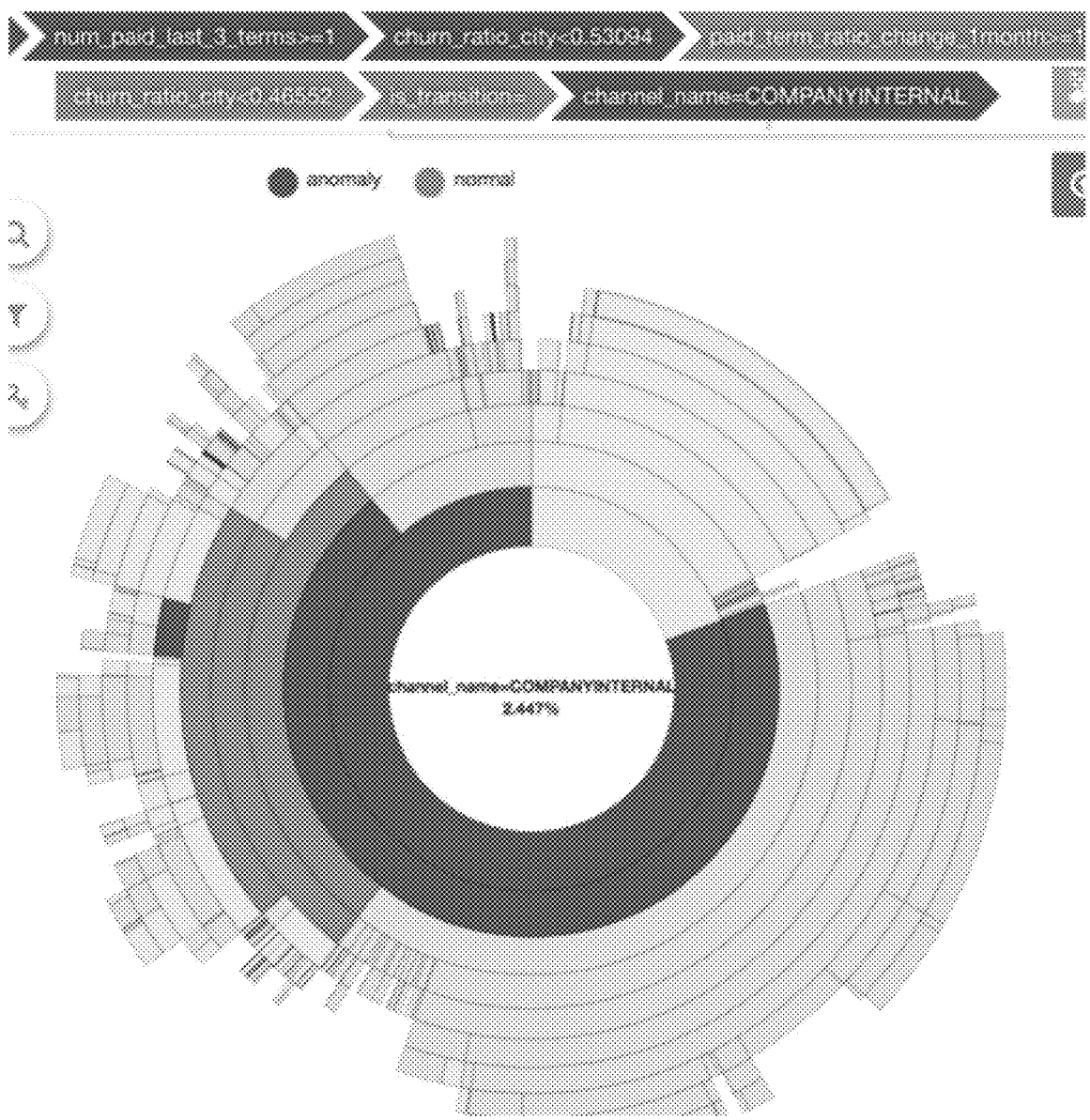
Figure 12B:
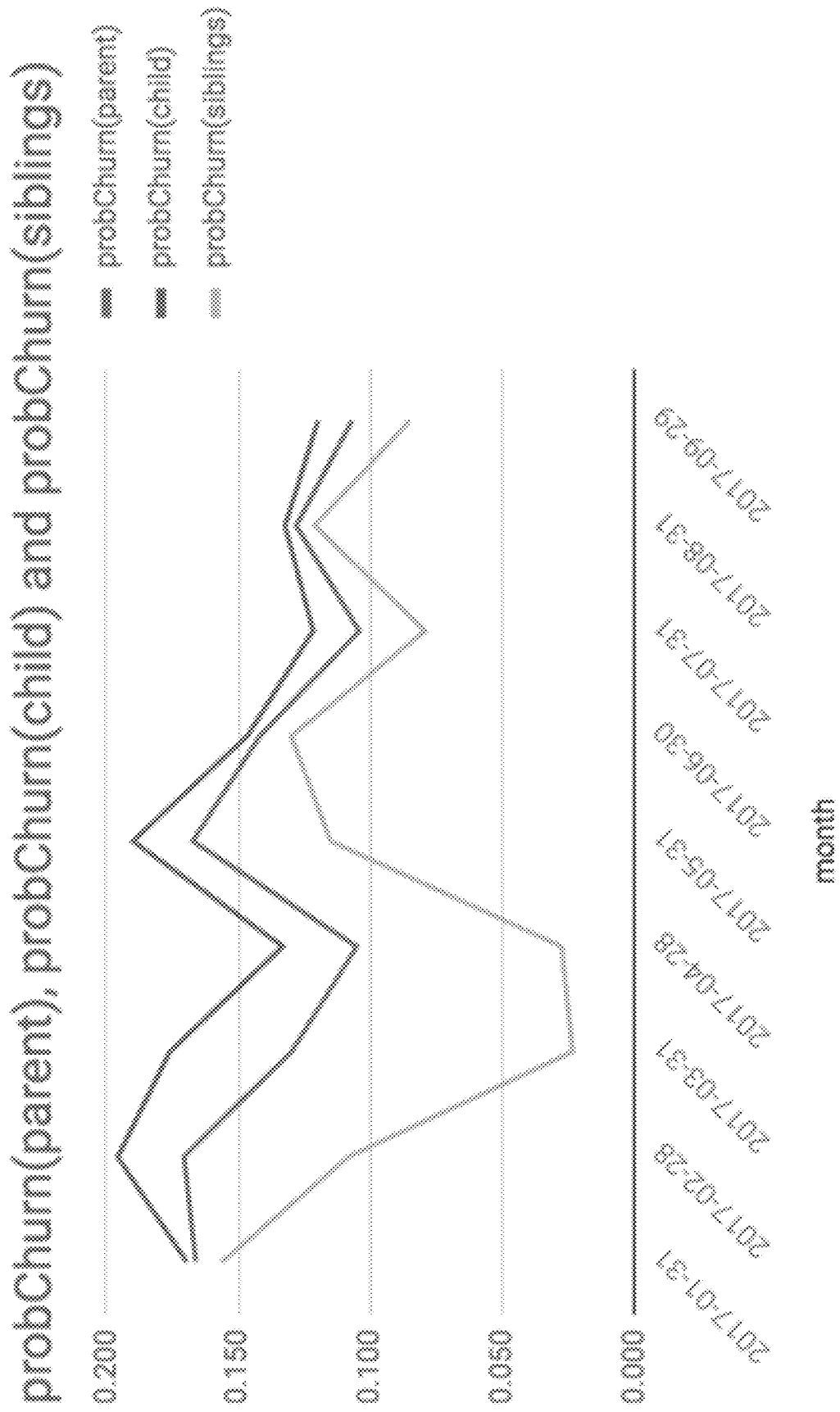
Figure 12C:
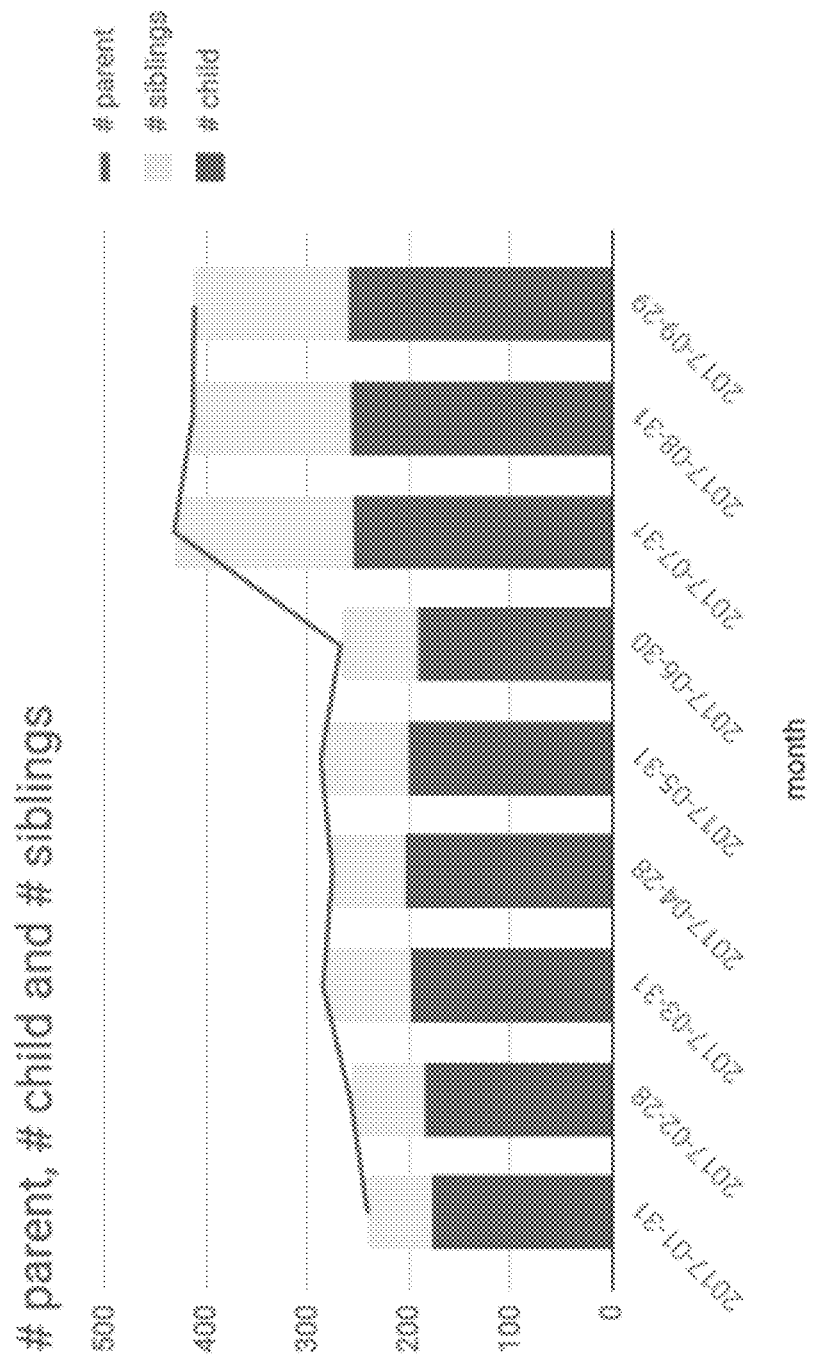

FIGS. 12A-12C show an example of a significant pattern and its evolution in time.

3. An Online Machine Learning System (OMLS) that can Learn in a User-Friendly Way from Both Human and Data at the Same Time The following, including all of Section 3, as well as the entire Detailed Description, describe some embodiments of the invention in an exemplary and non-limiting way.

Especially when obtaining labels is expensive since human effort is needed, being able to train the machine learning models with as little number of labeled examples as possible is preferred. Different types of semi-supervised machine learning methods, such as active learning [Settles, B. (2012). Active learning. Synthesis Lectures on Artificial Intelligence and Machine Learning, 6(1), 1-114] and co-training [Blum, A., & Mitchell, T. (1998, July). Combining labeled and unlabeled data with co-training. In Proceedings of the eleventh annual conference on Computational learning theory (pp. 92-100). ACM] have been developed for this purpose.

For online machine learning systems, learning from one or more human domain experts while also learning from the data stream is a challenging task. The machine learning system needs to be able to incorporate both the domain experts' past experience and future insights. It also needs to produce outputs that are as accurate and as stable as possible.

Figure 21:
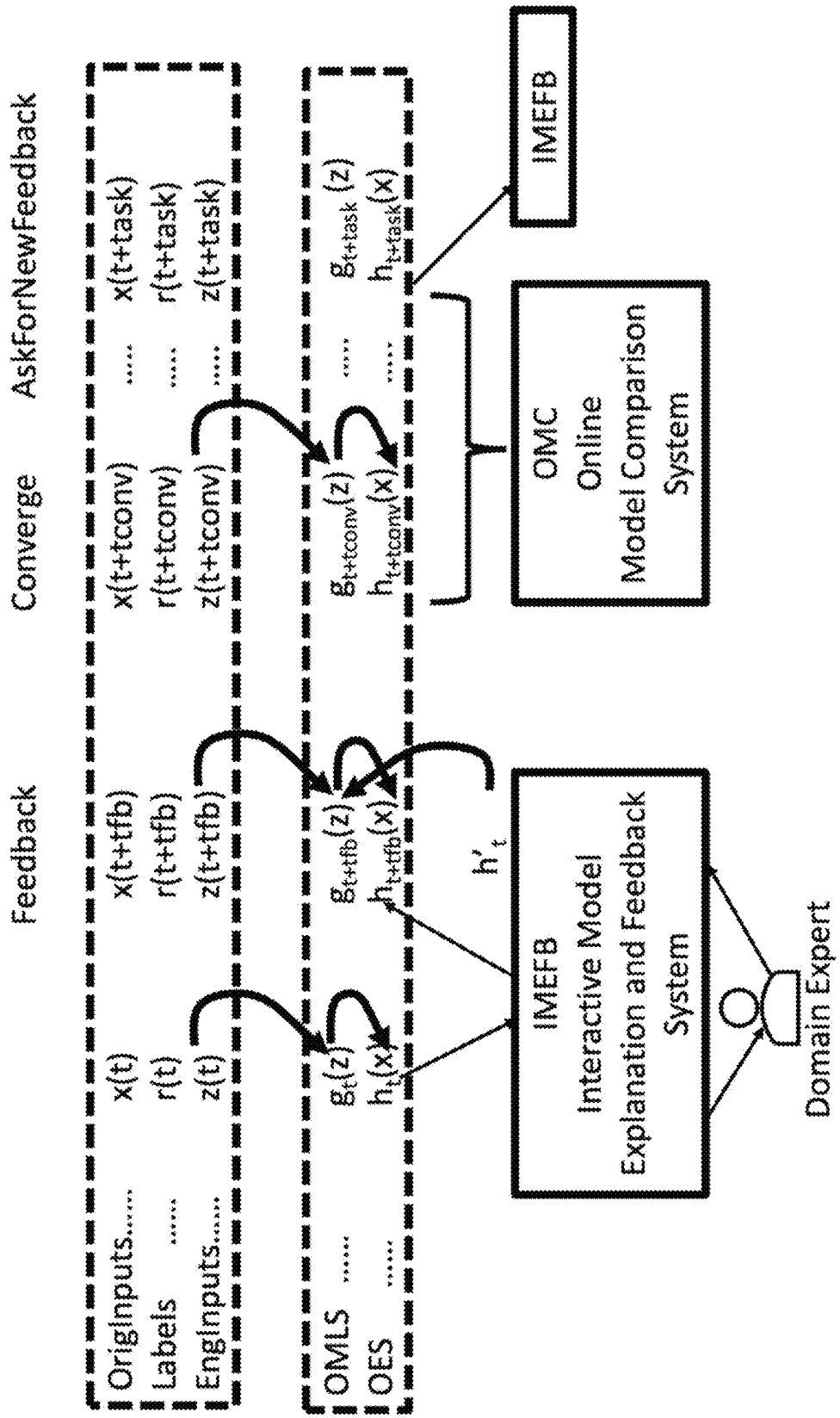
FIGS. 21-22 illustrate flow diagrams of the operations of one or more electronic devices implementing one or more aspects of an embodiment of the invention.

In this invention disclosure, the human domain expert feedback is collected through two different mechanisms: 1) Instance level feedback (see FIGS. 13 and 14), model level feedback (see FIG. 21). Through these mechanisms, the domain expert can update the models in OMLS (Online Machine Learning System) based on his/her experience. Since the models learn both from data and also from the human domain expert, a speed up in both learning speed and model accuracy is achieved.

3.1. Learning from Human and Data at the Instance Level:

3.1.1. A User Interface that Allows Business Experts to Easily Provide Instance Level Feedback:

In the instance level feedback mode, the domain expert is able to present feedback on different instances. The expert provides the label for a particular set of one or more instances.

The expert can inspect the instance and the prediction of the OMLS for the instance. The OMLS provides the predicted label, the confidence for the prediction and the coverage (the past number of instances labeled similarly). The OES (Online Explanation System) provides the explanation of reason for the particular prediction of the OMLS for the instance. The features of the particular instance are also presented to the user.

Figure 13:
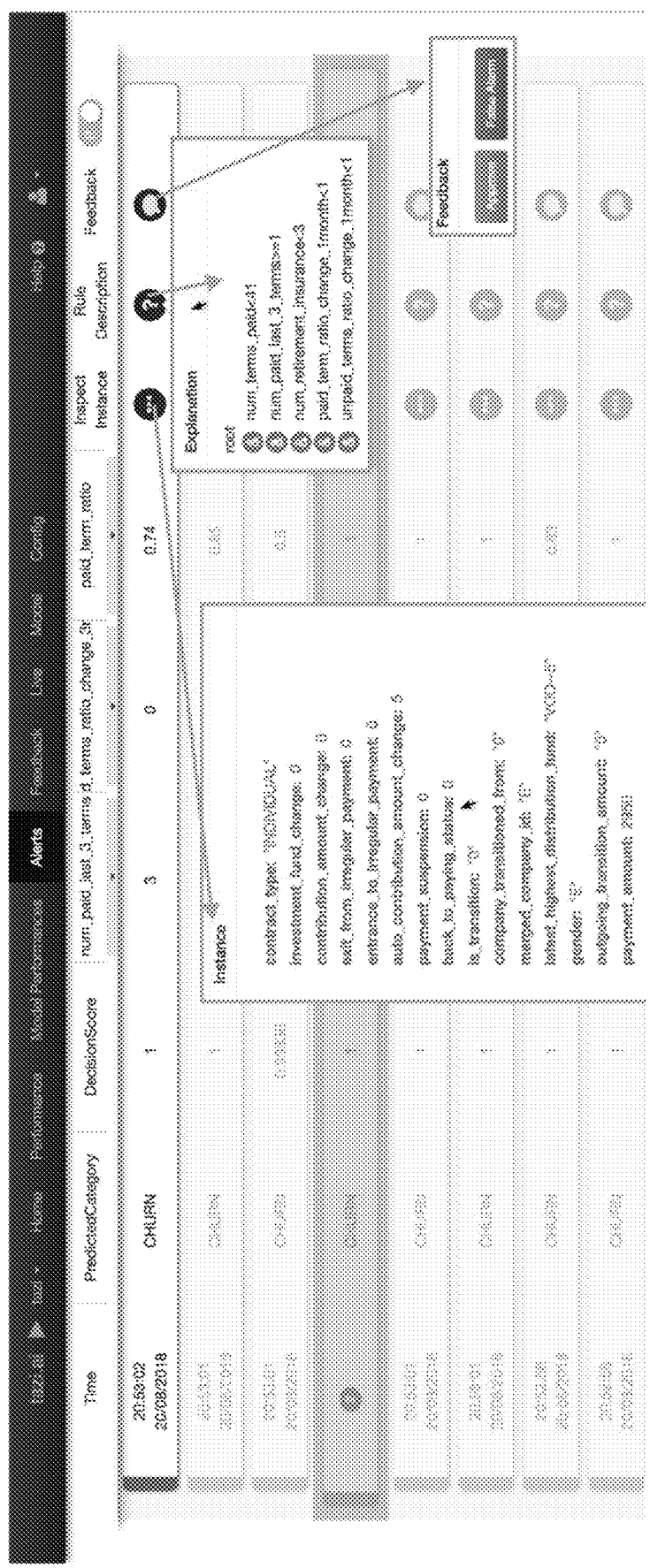

The instance level feedback can be provided in a number of ways. If only the instances in a certain class (for example the customer will churn, the current phone call is fraudulent) are of interest for the user because the user would take actions on those instances, the Alerts screen is used (FIG. 13.). At that screen, a set of instances labeled with the label of interest (for example, will-churn, is-fraud) are displayed. In order to reduce the time spent by the user, when a number of instances have the same model explanation, they are grouped together and only a subset of those instances are shown at the alert screen. The user is able to provide his/her feedback on whether the instance is classified correctly or not with the push of a button (FIG. 13). The user may Approve (confirm) or Disapprove (claim that the prediction is a false alarm) the prediction of the OMLS. The user may also choose not to provide a feedback.

Figure 14:
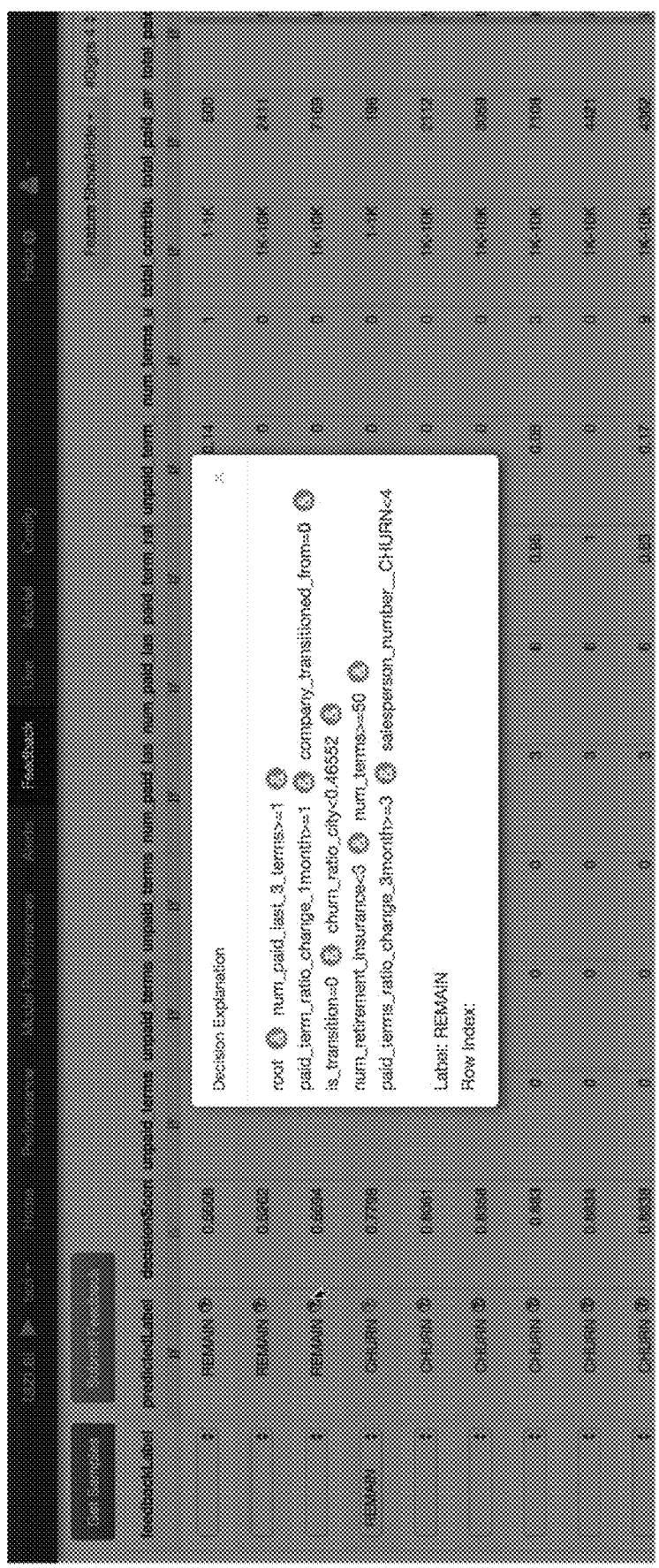

When the user wants to help the OMLS for the instances that the OMLS is unsure about, the active learning instance feedback is used (FIG. 14). The OMLS may request feedback for instances that would help it learn faster. These instances may be determined as instances for which the OMLS is unsure about. For example, the instances for which the confidence is low or the model variance is high could be selected as the active learning instances. The OMLS could have low confidence or high variance, for example, when there isn't enough data about a certain pattern (emerging pattern) or when a pattern that was valid previously is not valid anymore (diminishing pattern). The user is presented with the significance of the pattern (i.e. model explanation) for the instance over time so that the user might choose to change the label (diminishing pattern) or confirm it (emerging pattern). In both cases, the number of instances miclassified is reduced through the expert feedback.

When there are multiple machine learning models working together, each model could request an instance to be labeled to improve its own performance or the instance feedbacks could be requested based on an overall model confidence measure. When the individual models in the OMLS request feedback, the requests can be ordered based on the variance of all the model outputs for the feedback instance or the accuracy of the model that requests the instance. In order for the user to understand the predictions of the OMLS, both the features for the instances (for example ordered from the most relevant to the least relevant) and the model explanation are provided to the user.

FIG. 13 shows an example implementation of instance level human feedback for alerts (the windows in orange color denote pop-up windows)

FIG. 14 shows an example implementation of instance level human feedback for active learning. The user can ask the system which instances should be taught through the "Get Samples" button and submit his/her feedback through the "Submit Feedback" button.

3.1.2. Continuous Learning from the Instance Level Feedback and the Data:

Let r' be the feedback provided by the user. The feedback instances are stored together with the original inputs x that the explanation models use and the engineered features z, so that the OMLS can be trained with the (z,r') input and output. The OFM (Online Feature Mapping) System (FIG. 15) could just store the x,z and r' (feedback) triples if the number of feedback instances are not too high.

Each instance feedback could have a particular weight, determined according to the experience level or performance of the human domain expert.

When there are a multiplicity of models, they could each randomly be allowed to ask for feedback. In order to make the best use of domain expert time, models in the OMLS that benefit from it the most could be allowed to ask for more expert feedback.

Figure 15:
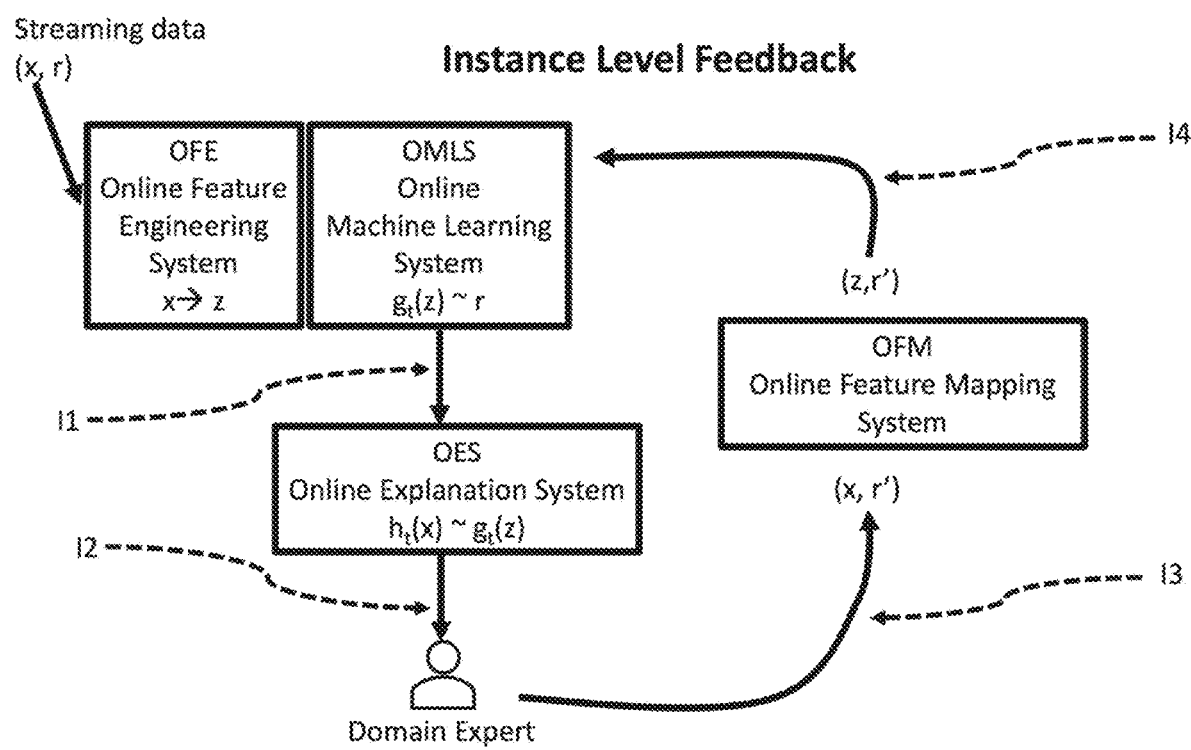
FIG. 15 illustrates a flow diagram of the operations of one or more electronic devices implementing one or more aspects of an embodiment of the invention.

FIG. 15 shows an an example implementation of instance level feedback from the domain expert.

3.2. Model Level Feedback:

3.2.1. A User Interface that Allows Business Experts to Easily Update the Machine Learning Models.

While exploring the machine learning model, the user might choose to give feedback on instances that fall under a specific portion of the model. If that is the case, the user is presented with those instances through an interface as in FIGS. 16-20. If the user wants to update the label for all the instances that fall under a portion of the model, s/he can directly label that portion of the model. Such model updates can be triggered for reasons such as, regulatory/legal changes, sudden environmental changes, emerging behaviour patterns which override the older ones, noise in the data, etc., where the data learned previously may not be valid anymore.

Figure 16:
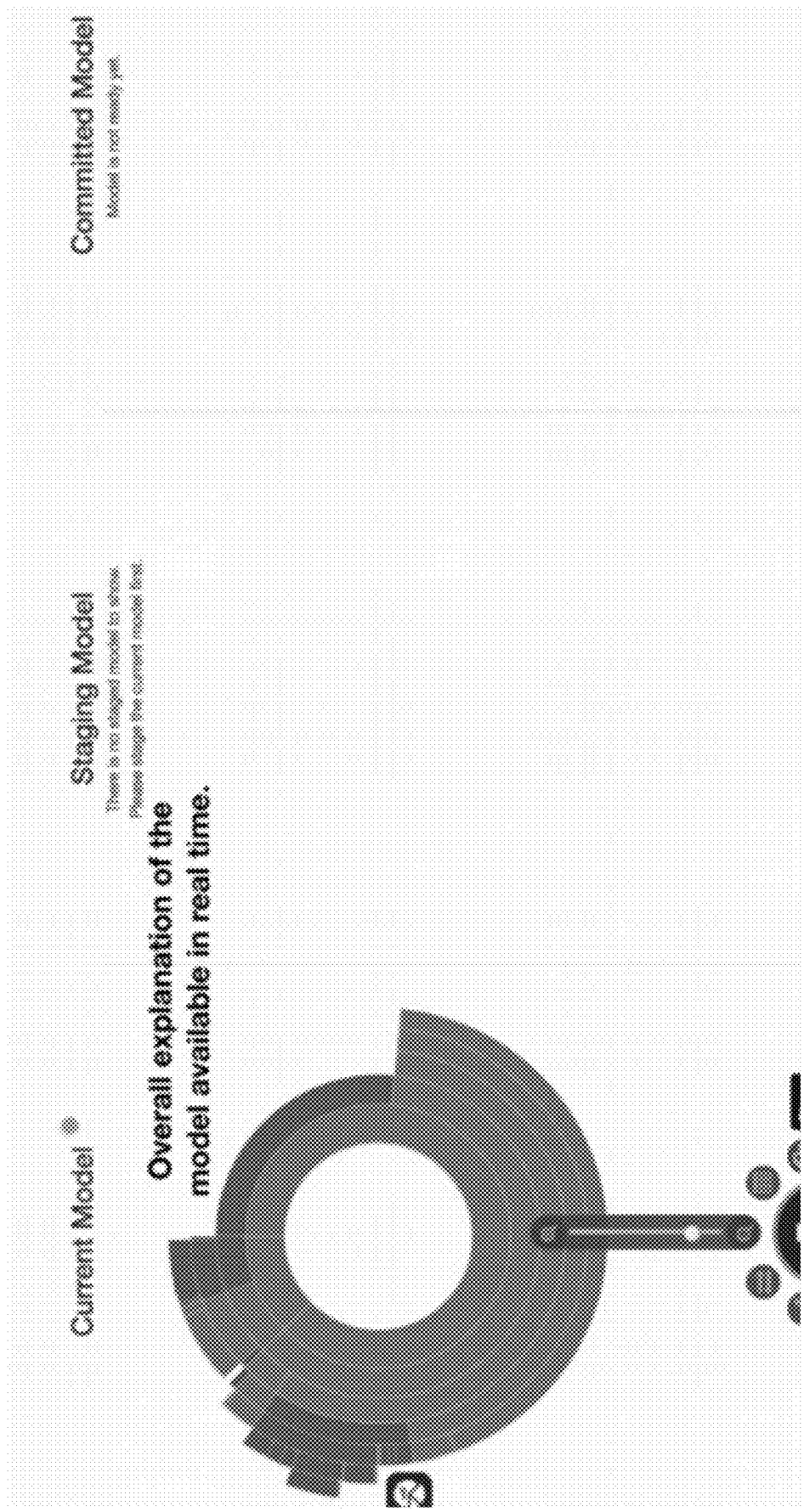
FIGS. 16-20 illustrate screenshots of an electronic device implementing one or more aspects of an embodiment of the invention.
Figure 17:
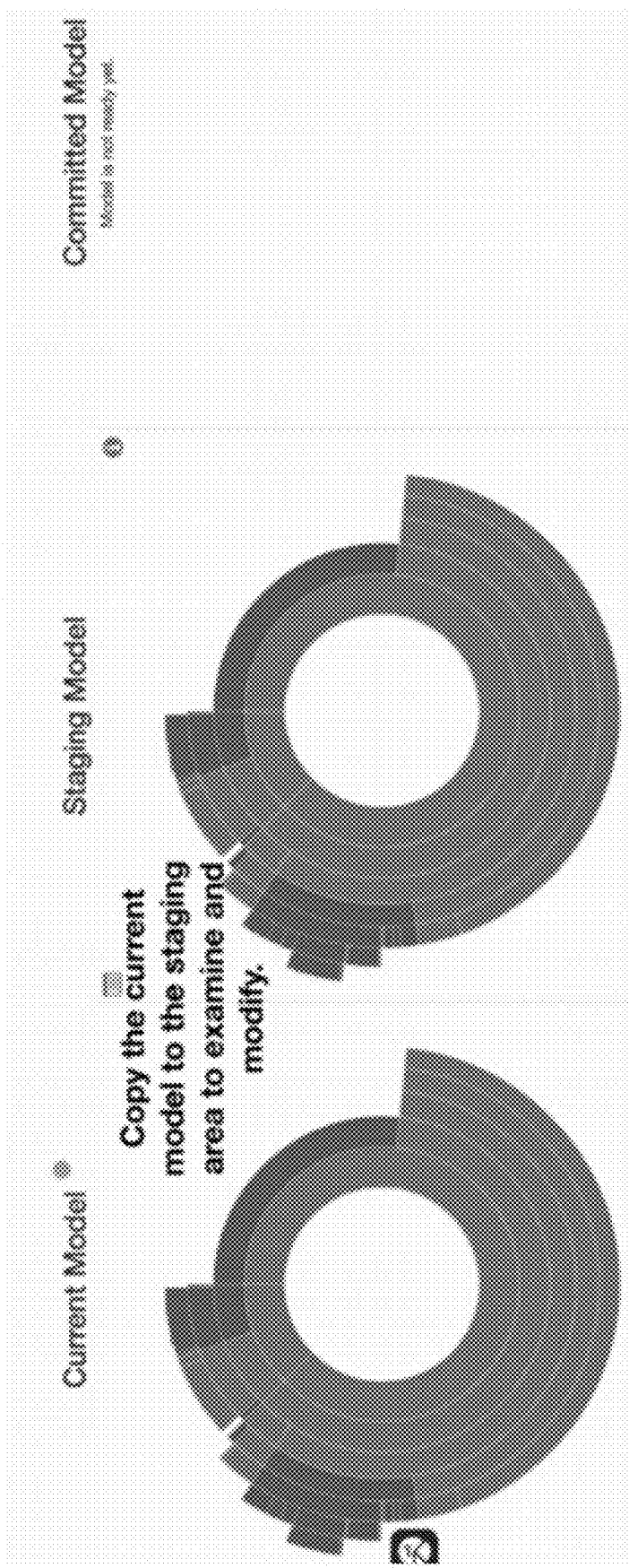
Figure 18:
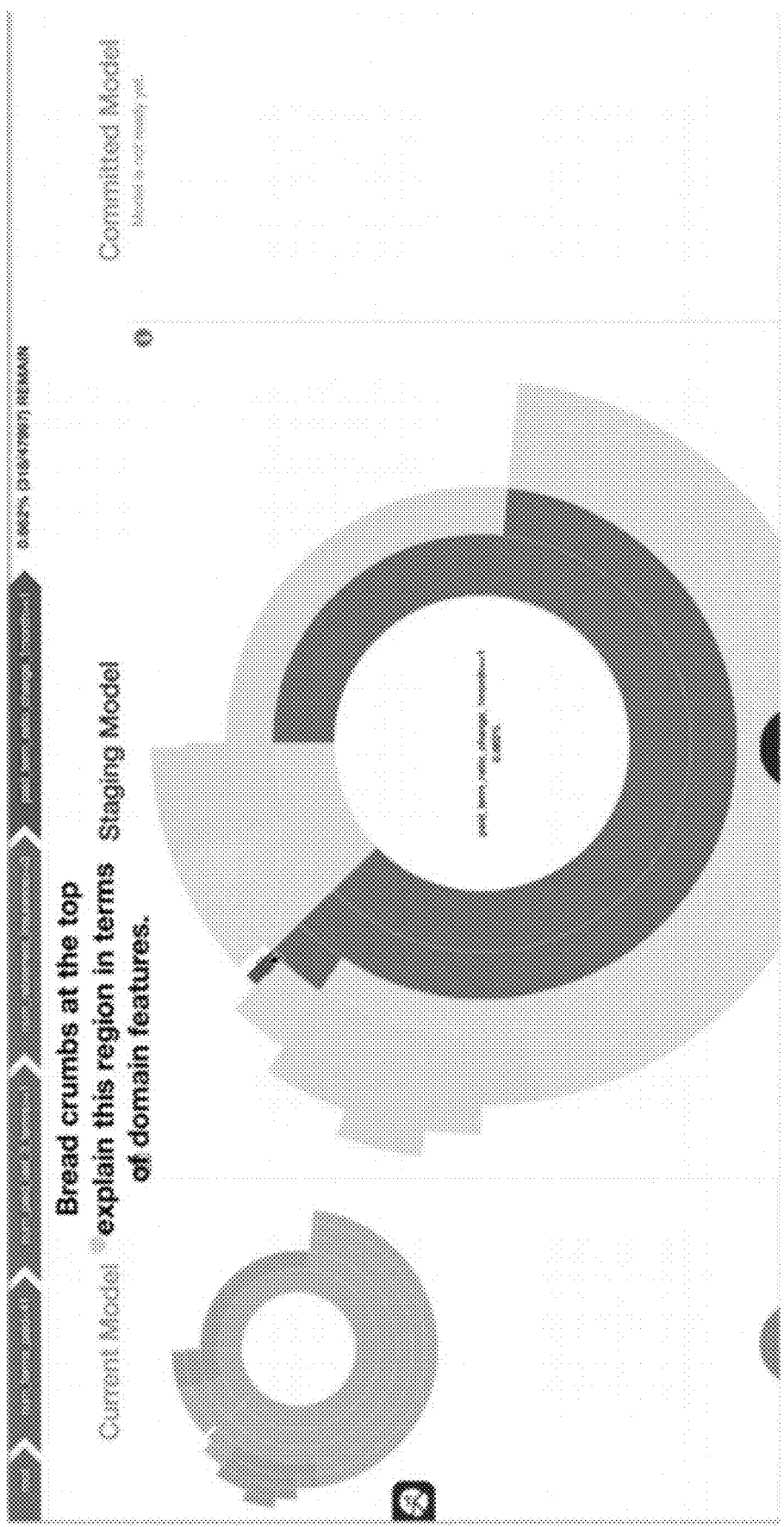

The explanation models that are trained continuously are first copied and taken to a staging area (FIG. 16, FIG. 17).

At the staging area, the user is able to examine (for an example, see FIG. 18) the details of the model by means of different filtering mechanisms, such as visualizing only the nodes that have a certain training/test accuracy or confidence, nodes that have more than a certain number of instances. Other examination mechanisms could be for the user to view and export a subset (randomly selected or most recent or all) of the instances that visited into a node in an explanation decision tree. The user could copy the explanation for a node. The user could also zoom in and out of the model to view the details of the model better.

Figure 19:
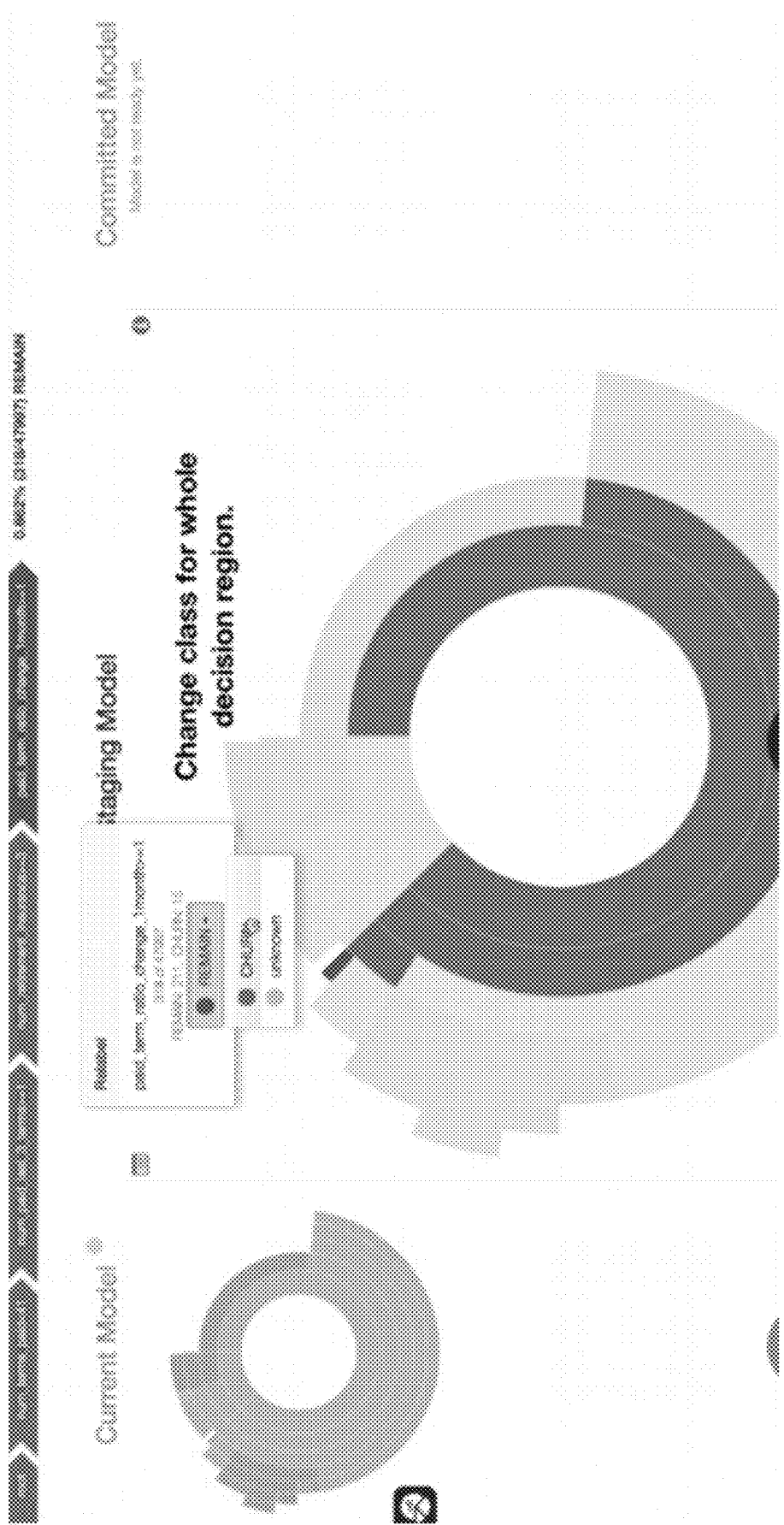

The expert user's feedback is taken through mechanisms such as the one shown in FIG. 19. In this example case, the expert can relabel a leaf node. Based on the number and the label of the instances relabeled, this relabeling can affect the labelings of the nodes between the node and the root. The user can also update the model by means of consolidating all the children of a node, causing the models to be simpler. Another feedback mechanism is for the user to change the threshold chosen for the continuous variables, for example a node might be branched according to feat_temp<=70 and feat_temp>70. The user might change the branching to be according to, for example, feat_temp<=65 and feat_temp>65. The user could also define new childrenfor or a subtree starting at a leaf node.

Figure 20:
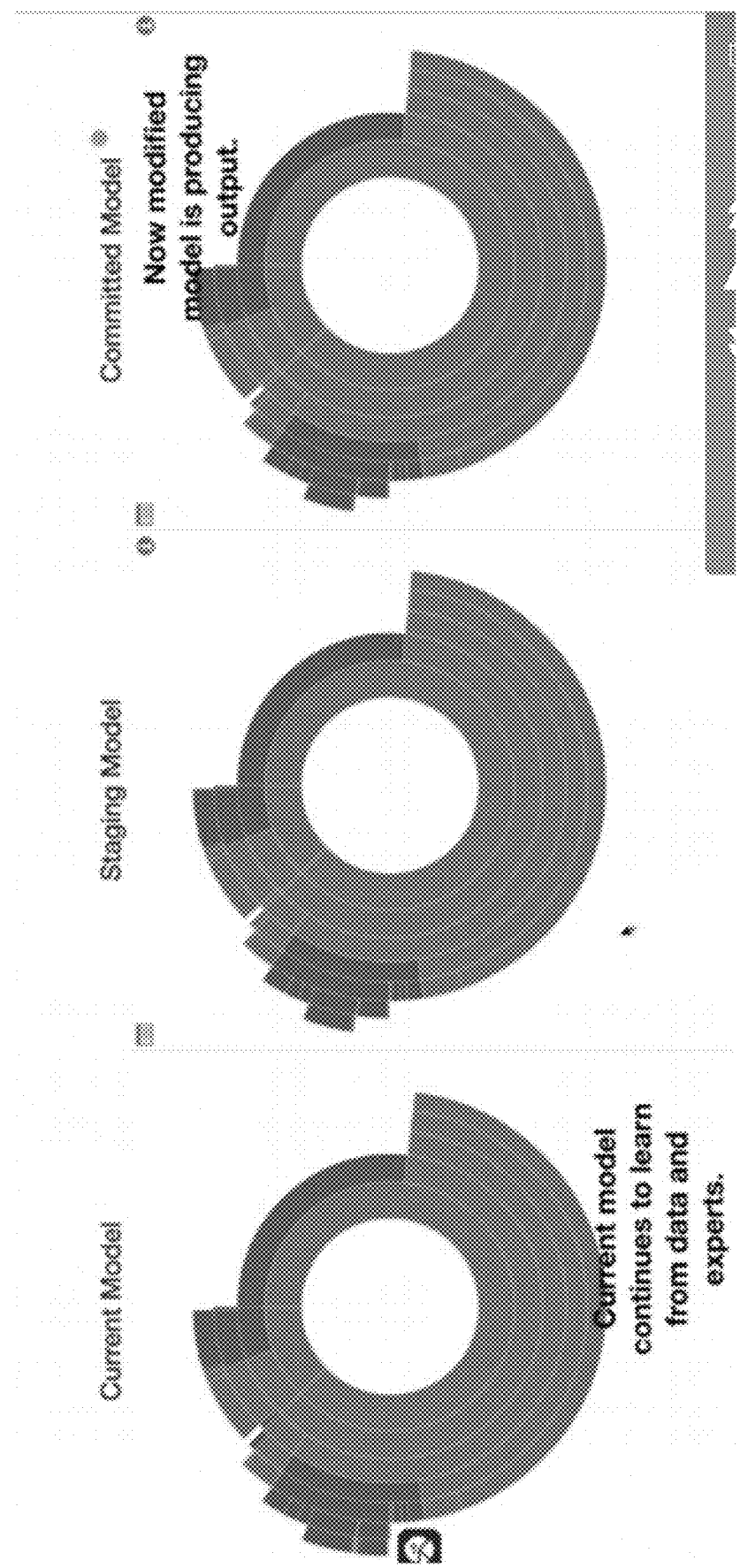

Once the domain expert has completed his/her feedback and is comfortable with the staged model, s/he commits the model (FIG. 20). The user might select either the committed model or the continuous learning model to provide the predictions for the streaming data.

FIGS. 16-20 show an example of an Interactive Model Explanation and Feedback System (IMEFB). The current and the staged model. The user can update the staged model, while the current model keeps being updated based on the streaming data. Each node color denotes a class, in this example, red: CustomerWillChurn, blue: CustomerWontChurn.

3.2.2. Continuous Update of the Machine Learning Models that can Learn from Human and Data at the Same Time Let t denote the instance the model is taken to the staging area and let t+tfb be the time that the domain expert has finished giving the feedback (i.e. committed the model). While the domain expert is working on the staged model, the current (online) models in OMLS and OES are continuously trained on the streaming data resulting in models $g_{t+tfb}(z)$ and $h_{t+tfb}(x)$ respectively (FIG. 21). Let $h_t'$ denote the committed model. Since the staged model reflects the domain expert opinion, the OMLS needs to learn from model $h_t'$ in addition to the streaming data. In order achieve this purpose, first of all, the instance regions in x where models $h_t'$ and $h_{t+tfb}$ differ are determined. Let D1=Dif($h_t$, $h_t'$) and D2=Dif($h_t$,$h_{t+tfb}$) denote the regions in the input X space where explanation models differ from each other. Synthetic (random) instances x are generated both from D1 and D2 and also regions outside these two (to make sure that the models do not diverge from each other) through the mechanisms detailed in section 3.2.3. These instances are mapped to z space using an autoassociative neural network (AANN) (see Section 3.2.4). Models in OMLS are trained through mechanisms similar to the ones in the instance level human expert feedback in Section 3.1. In the meantime, the OES is trained on the outputs of the OMLS. Once a stopping criterion is reached, for example, the OES and the $h_t'$ are similar, at the regions D1 and D2, up to a certain threshold level or a certain number of instances have been taught either at the streaming data or from the synthetic data, the OMLS training on the synthetic instances is finished at time t+tconv. The changes at the outputs of the explanation models between t+tconv and the models at time greater than t+tconv are measured continuously or at certain intervals. Once the difference between the explanation model at time t+tconv and the current explanation model gets large enough (t+task), the domain expert is alerted for providing model level feedback through the IMEFB system again. Note that the human domain expert could also model his/her expertise as a set of rules or another machine learning model and these could replace the human domain expert's model feedback or teacher models so that the human domain expert time is saved.

FIG. 21 shows an example implementation of model level feedback from the human domain expert.

3.2.3. Instance Generator for Model Based Feedback

Random instances that obey the distribution of inputs x need to be generated so that they can be used for creation of synthetic instances. The synthetic instances can be fed to any teacher model whose outputs will be used to teach some other model.

In order to be able to generate instances, we assume that there are a certain number N of instances X, where each input is of dimension d. These instances X could have been observed recently in a data stream.

Let instance i be represented as: $x_i=[x_{i1}, \ldots, x_{1d}]$. The original instance can contain features that are in different ranges and are contiuuous or categorical. In order to make sure that each feature is given fair treatment by the instance generator, all features are normalized.

$x_i$ is produced by normalizing the original inputs so that $x_i$ in [0:1] for dimensions that are continuous (min-max normalization) and if a dimension is discrete, taking K different values, it is encoded as a K-dimensional binary vector (1 hot or 1-of-K encoding). If K is too large, some values that are seen rarely may be collected under the same (for example "other" category). These input transformers are saved so that they can be used while the instance generator is used live.

While the instances in X are observed, first of all statistics (such as mean, std, min, max, histogram, etc.) on each input dimension is computed. A random instance can be generated by means of picking a random feature value for each dimension. The problem with this approach is that it does not take into account the dependencies between features. Therefore, the resulting instance might be too far away from what would have been observed actually in the data stream.

In order to keep track of the dependencies between features, an autoencoder (auto associative neural network) [Goodfellow, I., Bengio, Y., Courville, A., & Bengio, Y. (2016). Deep learning (Vol. 1). Cambridge: MIT press] is trained.

The autoencoder takes as an input instance $x_i$ and produces an output $y_i$ which aims to be as close to $x_i$ as possible. The autoencoder minimizes an error function E, such as mean absolute error (MAE) or mean squared error (MSE) which gets smaller as $x_i$ and $y_i$ are close to each other. While training the autoencoder, we compute the error $E_k$ for the instances in each class k. If the error for class k is much larger than the others, then we oversample the instances in class k while training the autoencoder.

Using both statistics and the available instances, we generate random instances as follows:

If there is a set of instances X available:
Pick a random instance $x_i$ from X
$x=x_i$
Pick m separate random dimensions, $j_1, \ldots, j_m$ in 1, ..., d
For each dimension jm
pick another instance $x_k$ from X, switch $x_{-jm}$ with $x_{k,jm}$
Feed x to autoencoder
The output y is a generated instance.
If only the statisitcs on each input dimension is available and there is no already available dataset X:
Use the statistics to generate an instance $x_i$
$x=x_i$
repeat until the autoencoder input and output are close enough to each other:
Feed x to autoencoder
Set x to the output y of the autoencoder.

3.2.4. Online Feature Mapping System to Generate the Engineered Features from the Original Features:

When the domain expert provides a model feedback based on the OES (Online Explanation System), the feedback usually contains not the whole input vector x, but only a portion of it. For example, x might contain [dark,cold,rain] and the feedback might be, "if rain=true and cold=true then bring_coat=true". On the other hand, the OMLS is trained on z's which contain the whole x and also the engineered features obtained from all of x. In order to be able to get a complete z vector to be used for training the OMLS, we devise a method that enables reconstruction of z from x or parts of x. The method involves generation of a mapping system trained to map z to z, as in the case of an autoassociative neural network or Auto Encoder [Wang, Y., Yao, H., & Zhao, S. (2016). Auto-encoder based dimensionality reduction. Neurocomputing, 184, 232-242, Goodfellow, I., Bengio, Y., Courville, A., & Bengio, Y. (2016). Deep learning (Vol. 1). Cambridge: MIT press](AANN, FIG. 22). The bottleneck features y, of dimension the same as the number of features in the input x, are allowed to be initially free as in the case of a traditional autoassociative neural network. Then for each feature $y_i$, the closest input feature dimension is determined based on a similarity measure such as the Euclidean distance. While the AANN is trained the error function to be optimized becomes:

$$E(t)=\text{Error}(z_t,z_t')+\lambda \text{Error}[x_t,y_t]$$

Enabling the AANN to learn a z to z mapping together with an x to z mapping.

Figure 22:
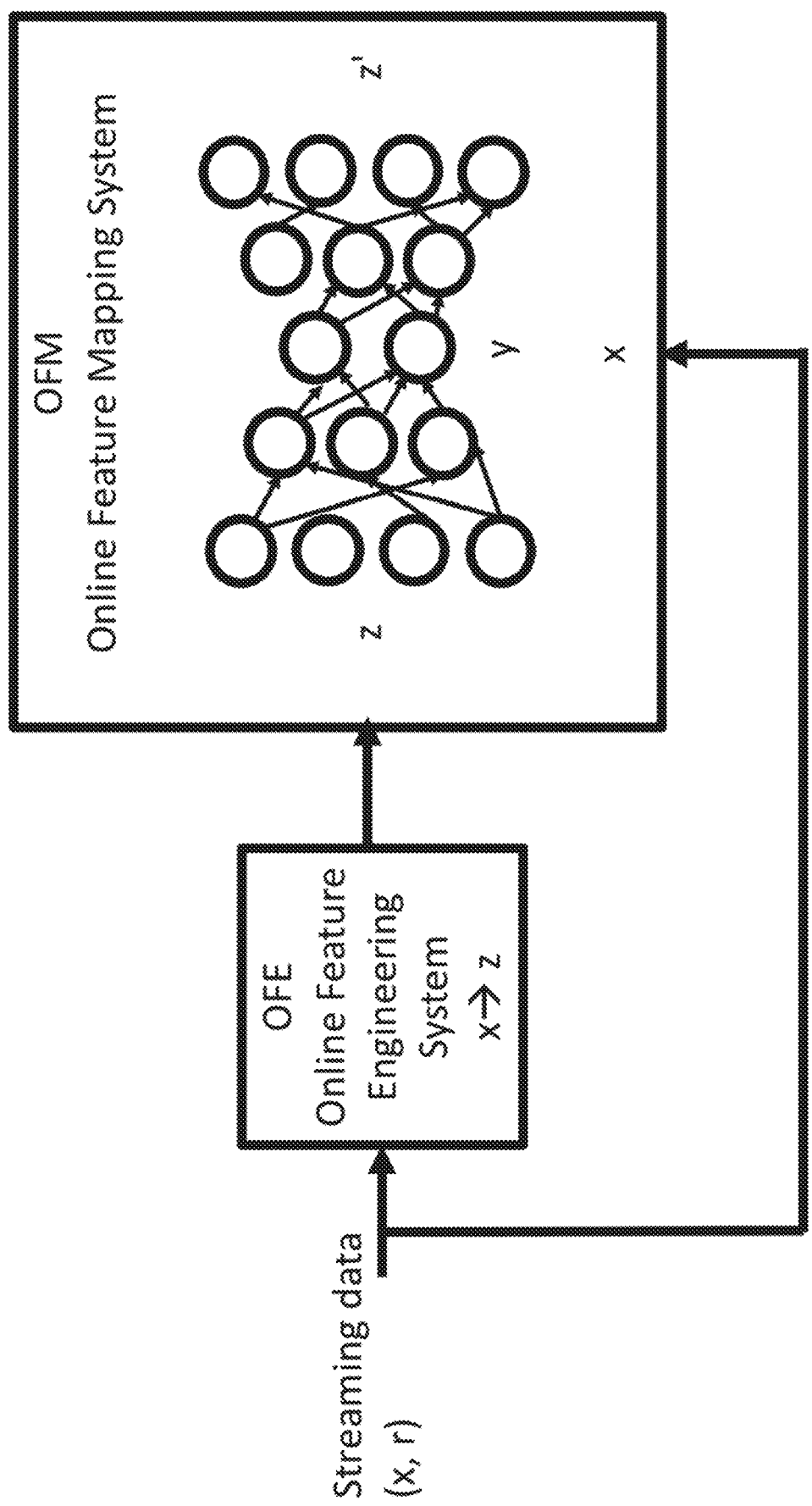

FIG. 22 shows training of an auto associative neural network online to learn both the inputs for the OMLS (z to z') and the original input x to the engineered feature z mapping.

3.2.5. Feedback from Multiple Experts

There can be multiple experts, providing feedback on different explanation models. The feedback from all those experts can be collected together and the machine learning models can be updated. Each expert could have a weight based on their expertise or past/expected performance. The experts' weight can also be updated based on how correct they are. Correctness can be measured continuously based on the quality of each expert's feedback. Each expert updates a different explanation model and the OMLS is trained using all the explanation models. Each explanation model's performance is measured against the actual labels. The experts' weight is updated based on the performance of his explanation model.

The OES can be used as a proxy for the OMLS. In certain usecases in regulated industries, such as banking and insurance, a fixed and auditable explanation set is required. A snapshot of an OEM at a selected point in time can be used to produce approved and auditable outputs. Only a privileged domain expert would be able to supply his/her OEM for this purpose.

Instead of human experts, a rule based system that has been approved by the domain experts can also be employed to give instance or model level feedback to the OMLS and OES.

While certain illustrative embodiments are described herein, it should be understood that those embodiments are presented by way of example only, and not limitation. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

What is claimed is:

1. An Online Machine Learning System (OMLS) implemented on one or more electronic devices comprising one or more processors, the system comprising:
an Online Preprocessing Engine (OPrE) stored on a non-transitory computer readable memory and implemented using the one or more processors and configured to (a) receive streaming data including a first instance comprising a vector of inputs, the vector of inputs comprising a plurality of continuous or categorical features; (b) discretize features; (c) impute missing feature values; (d) normalize features; and (e) detect drift or change in features;

an Online Feature Engineering Engine (OFEE) stored on a non-transitory computer readable memory and implemented using the one or more processors and configured to produce features;

an Online Robust Feature Selection Engine (ORFSE) stored on a non-transitory computer readable memory and implemented using the one or more processors, and configured to evaluate and select features by computing a first relevance value of one of the features based on a mutual information correlation between the first instance and one or more additional instances of vectors of inputs in the streaming data received by the OPrE and comparing the computed first relevance value to a second relevance value that is computed using a shuffled order of the instances of vectors of inputs to determine feature relevance;

an Online Machine Learning Engine (OMLE) stored on a non-transitory computer readable memory and implemented using the one or more processors, and configured to incorporate and utilize one or more machine learning algorithms or models utilizing features selected by the ORFSE, to generate a result, and capable of incorporating and utilizing multiple different machine learning algorithms or models, wherein each of the OMLE, the OPrE, the OFEE, and the ORFSE are continuously communicatively coupled to each other, and wherein the OMLS is configured to perform continuous online machine learning.

2. The system of claim 1, wherein the OMLS performs continuous online machine learning, and wherein continuous online machine learning comprises per-instance learning.

3. The system of claim 1, wherein the OMLS is continuously operational during feature additions and feature deletions.

4. The system of claim 1, wherein the OMLS incorporates and utilizes one or more machine learning algorithms or models.

5. The system of claim 1, wherein operation of the OPrE, the OFEE, and the ORFSE contribute to OMLS speed, accuracy, stability, and robustness.

6. The system of claim 1, wherein the OMLE can be operated to optimize business benefit performance.

7. The system of claim 1, wherein the OPrE discretizes features, normalizes features, imputes missing feature values, and detects drift or change in features or labels.

8. The system of claim 1, wherein the ORFSE evaluates features, including with regard to a degree of relevance to a particular machine learning task.

9. The system of claim 1, wherein the ORFSE utilizes a statistical significance test to evaluate feature relevance.

10. The system of claim 1, wherein each of the OMLE, the OPrE, the OFEE and the ORFSE are capable of updating on a per-instance basis.

11. The system of claim 1, wherein the OMLE is capable of evaluating, weighting and selecting particular machine learning algorithms or models for optimization of operation of the OMLS.

12. The system of claim 1, wherein the OMLE is capable of utilizing multiple machine learning algorithms or models in an integrated way.

13. The system of claim 1, wherein the OMLE is capable of keeping and eliminating particular machine learning algorithms or models to optimize operation of the OMLS.

14. The system of claim 1, wherein the OMLE is capable of training each of multiple different incorporated machine learning algorithms or models according to different criteria.

15. The system of claim 1, wherein the multiple machine learning algorithms comprises a combination of one or more decision tree-based algorithms or models, one or more clustering-based algorithms or models, one or more linear regression algorithms or models, one or more neural network algorithms or models, and one or more graphical algorithms or models.

16. The system of claim 1, wherein the OMLE incorporates, utilizes, evaluates and selects from multiple machine learning algorithms.

17. The system of claim 1, wherein the instance received by the OPrE comprises a set of features, and wherein the OFEE is configured to enable production of additional features in addition to features in the received set of features.

18. The system of claim 1, wherein the one or more electronic devices comprises at least one of a server, a desktop, a laptop computer, a set top box, a tablet, a cell phone, a smartphone, or a computing device capable of sending, receiving, and processing data.

19. The system of claim 1, wherein the features that the OFEE is configured to produce comprise engineered inputs that are produced by transforming the vector of inputs of the first instance that have been preprocessed by the OPrE, wherein the produced features are in addition to the plurality of continuous or categorical features in the first instance of the vector of inputs.

20. An online machine learning method to be implemented on one or more electronic devices comprising one or more processors, the method comprising:
   (a) receiving, at an Online Preprocessing Engine (OPrE) stored on a non-transitory computer readable memory, streaming data including a first instance comprising a vector of inputs, the vector of inputs comprising a plurality of continuous or categorical features; and
   (b) discretizing features using the OPrE, wherein the OPrE is capable of imputing missing feature values, normalizing features, and detecting drift or change in features;
   producing features, using an Online Feature Engineering Engine (OFEE) stored on a non-transitory computer readable memory;
   evaluating and selecting features, using an Online Robust Feature Selection Engine (ORFSE) stored on a non-transitory computer readable memory, comprising computing a first relevance value of one of the features based on a mutual information correlation between the first instance and one or more additional instances of vectors of inputs in the streaming data received by the OPrE and comparing the computed first relevance value to a second relevance value that is computed using a shuffled order of the instances of vectors of inputs to determine feature relevance; and
   incorporating and utilizing multiple machine learning algorithms or models utilizing features selected by the ORFSE at an Online Machine Learning Engine (OMLE) stored on a non-transitory computer readable memory, to generate a result,
   wherein each of the OMLE, the OPrE, the OFEE, and the ORFSE are continuously communicatively coupled to each other; and wherein the method further comprises continuously performing, by the OMLS, operational online machine learning.

21. The method of claim 20, further comprising utilizing an Online Explanation System (OES), stored on a non-transitory computer readable memory, to provide instance level and model level explanations to a user.

22. The method of claim 20, further comprising utilizing an Online Human Expert Feedback System (OEFS), stored on a non-transitory computer readable memory, in obtaining, for optimization of operation of the OMLS, instance level expert feedback and model level expert feedback.

23. The method of claim 21, wherein the OES comprises an explanation machine learning model that is trained using the vector of inputs so that the explanation learning model is understandable by a human.

24. The method of claim 23, wherein the explanation machine learning model also uses select engineered inputs that are understandable by a human.

25. The method of claim 21, wherein the OES is configured to accommodate user preferences for explanations.

26. The method of claim 21, wherein the OES comprises a plurality of Online Explanation Models (OEMs).

27. The method of claim 21, wherein the OES is updated continuously.

28. The method of claim 21, wherein the OES is separate from but in communication with the OMLS, and wherein the OES is updated while the OMLS is updated.

29. The method of claim 22, further comprising utilizing human expert preferences as specified at the OEFS to control which features are used in the OMLS or how the features are used.

30. The method of claim 20, wherein the step of producing features using the OFEE, comprises producing features by transforming the vector of inputs of the first instance that have been preprocessed by the OPrE into engineered inputs, wherein the produced features are in addition to the plurality of continuous or categorical features in the first instance of the vector of inputs.

31. An Online Machine Learning System (OMLS) implemented on one or more electronic devices comprising one or more processors, the system comprising:
   an Online Preprocessing Engine (OPrE), stored on a non-transitory computer readable memory and implemented using the one or more processors and configured to (a) receive streaming data including a first instance comprising a vector of inputs, the vector of inputs comprising a plurality of continuous or categorical features; (b) be able to discretize features; (c) be able to impute missing feature values; (d) be able to normalize features; and (e) be able to detect drift or change in features;
   an Online Feature Engineering Engine (OFEE) stored on a non-transitory computer readable memory and implemented using the one or more processors and configured to produce features;
   an Online Robust Feature Selection Engine (ORFSE) stored on a non-transitory computer readable memory and implemented using the one or more processors and configured to evaluate and select features by computing a first relevance value of one of the features based on a mutual information correlation between the first instance and one or more additional instances of vectors of inputs in the streaming data received by the OPrE and comparing the computed first relevance value to a second relevance value that is computed using a shuffled order of the instances of vectors of inputs to determine feature relevance;
   an Online Machine Learning Engine (OMLE) stored on a non-transitory computer readable memory and implemented using the one or more processors and configured to incorporate and utilize one or more machine learning algorithms or models utilizing features selected by the ORFSE, to generate a result, and capable of incorporating and utilizing multiple different machine learning algorithms or models;
   an Online Explanation System (OES) stored on a non-transitory computer readable memory and implemented using the one or more processors and configured to provide instance level and model level explanations to a user; and
   an Online Human Expert Feedback System (OEFS) stored on a non-transitory computer readable memory and implemented using the one or more processors and configured to obtain, for optimization of operation of the OMLS, instance level expert feedback and model level expert feedback;
   wherein each of the OMLE, the OPrE, the OFEE, the ORFSE, the OES and the OEFS are continuously communicatively coupled to each other and capable of continuous updating; and
   wherein the OMLS is configured to perform continuous online machine learning comprising per-instance learning.

32. A non-transitory computer readable medium or media containing instructions for executing a method for performing online machine learning using one or more electronic devices comprising one or more processors, the method comprising:
   (a) receiving, at an Online Preprocessing Engine (OPrE), streaming data including a first instance comprising a vector of inputs, the vector of inputs comprising a plurality of continuous or categorical features; and (b) discretizing features using the OPrE, wherein the OPrE is capable of imputing missing feature values, normalizing features, and detecting drift or change in features;
   producing features, using an Online Feature Engineering Engine (OFEE);
   evaluating and selecting features, using an Online Robust Feature Selection Engine (ORFSE), comprising computing a first relevance value of one of the features based on a mutual information correlation between the first instance and one or more additional instances of vectors of inputs in the streaming data received by the OPrE and comparing the computed first relevance value to a second relevance value that is computed using a shuffled order of the instances of vectors of inputs to determine feature relevance; and
   incorporating and utilizing multiple machine learning algorithms or models utilizing features, selected by the ORFSE, at an Online Machine Learning Engine (OMLE), to generate a result;
   wherein each of the OMLE, the OPrE, the OFEE and the ORFSE are continuously communicatively coupled to each other; and
   wherein the method further comprises continuously operational online machine learning by the OMLS.

* * * * *